(12) United States Patent
Shimbo et al.

(10) Patent No.: US 11,236,001 B2
(45) Date of Patent: Feb. 1, 2022

(54) HYDROTHERMAL TREATMENT DEVICE, BIOMASS FUEL MANUFACTURING PLANT, HYDROTHERMAL TREATMENT METHOD, AND BIOMASS FUEL MANUFACTURING METHOD

(71) Applicant: Mitsubishi Power, Ltd., Yokohama (JP)

(72) Inventors: Yoichi Shimbo, Kanagawa (JP); Yuta Ozawa, Kanagawa (JP); Akito Yoshida, Kanagawa (JP)

(73) Assignee: MITSUBISHI POWER, LTD., Yokohama (JP)

( * ) Notice: Subject to any disclaimer, the term of this patent is extended or adjusted under 35 U.S.C. 154(b) by 0 days.

(21) Appl. No.: 15/734,793

(22) PCT Filed: May 30, 2019

(86) PCT No.: PCT/JP2019/021605
§ 371 (c)(1),
(2) Date: Dec. 3, 2020

(87) PCT Pub. No.: WO2019/239915
PCT Pub. Date: Dec. 19, 2019

(65) Prior Publication Data
US 2021/0230494 A1 Jul. 29, 2021

(30) Foreign Application Priority Data
Jun. 14, 2018 (JP) .............................. JP2018-113616

(51) Int. Cl.
*C10L 5/44* (2006.01)
*C02F 11/127* (2019.01)
(Continued)

(52) U.S. Cl.
CPC ............... *C02F 11/12* (2013.01); *B01D 3/26* (2013.01); *B01F 7/18* (2013.01);
(Continued)

(58) Field of Classification Search
CPC .... C10L 5/44; C10L 2290/24; C10L 2290/06; C10L 2200/0469; C10L 2290/08;
(Continued)

(56) References Cited

U.S. PATENT DOCUMENTS

| 4,670,397 A | 6/1987 | Wegner et al. |
| 5,478,535 A | 12/1995 | Fierz et al. |
| 2019/0151911 A1 | 5/2019 | Kimura et al. |

FOREIGN PATENT DOCUMENTS

| GB | 806995 A | 1/1959 |
| JP | S64-032800 U | 3/1989 |

(Continued)

OTHER PUBLICATIONS

JP2004167333A Google Patents Translation (Year: 2004).*
(Continued)

*Primary Examiner* — Ellen M McAvoy
*Assistant Examiner* — Chantel L Graham
(74) *Attorney, Agent, or Firm* — Westerman, Hattori, Daniels & Adrian, LLP

(57) ABSTRACT

A hydrothermal treatment device (3) is a hydrothermal treatment device (3) performing hydrothermal treatment by heating high-water-content biomass, the hydrothermal treatment device (3) including a treatment container (21) that stores sludge, a sludge supply unit (22) that supplies the sludge to inside of the treatment container (21) such that a space (S) is formed in a vertical upper part of the treatment container (21), a stirrer (23) that is provided within the treatment container (21) and stirs stored matter such that counter flows in an up/down direction occur, and a heat (Continued)

transfer tube (24) that is disposed in a horizontal direction within the treatment container (21) and heats the sludge with heat of vapor flowing within the heat transfer tube (24).

18 Claims, 8 Drawing Sheets

(51) Int. Cl.

| | | |
|---|---|---|
| *C02F 11/18* | (2006.01) | |
| *B01F 7/18* | (2006.01) | |
| *B01F 15/06* | (2006.01) | |
| *B01F 15/00* | (2006.01) | |
| *B01D 3/26* | (2006.01) | |
| *C02F 11/02* | (2006.01) | |
| *B01F 15/04* | (2006.01) | |
| *B09B 3/00* | (2006.01) | |
| *C02F 11/12* | (2019.01) | |
| *C02F 11/13* | (2019.01) | |

(52) U.S. Cl.
CPC ........ *B01F 15/00389* (2013.01); *B01F 15/04* (2013.01); *B01F 15/066* (2013.01); *B09B 3/0083* (2013.01); *C02F 11/02* (2013.01); *C02F 11/13* (2019.01); *C10L 5/44* (2013.01); *B01F 2015/062* (2013.01); *C10L 2200/0469* (2013.01); *C10L 2290/06* (2013.01); *C10L 2290/08* (2013.01); *C10L 2290/24* (2013.01)

(58) Field of Classification Search
CPC ...... B01F 7/18; B01F 15/04; B01F 15/00389; B01F 15/066; B01F 2015/062; C02F 11/127; C02F 11/18; C02F 11/02; B01D 3/26; B09B 3/0083
See application file for complete search history.

(56) References Cited

FOREIGN PATENT DOCUMENTS

| | | | |
|---|---|---|---|
| JP | 2004167333 A | * | 6/2004 |
| JP | 2004330082 A | * | 11/2004 |
| JP | 2006266552 A | * | 10/2006 |
| JP | 2008-100218 A | | 5/2008 |
| JP | 2013167417 A | * | 8/2013 |
| JP | 2016041633 A | * | 3/2016 |
| JP | 6190082 B1 | | 8/2017 |
| WO | 2008/138637 A2 | | 11/2008 |
| WO | 2013/124414 A2 | | 8/2013 |
| WO | 2015/072961 A1 | | 5/2015 |

OTHER PUBLICATIONS

JP2004330082A Google Patents Translation (Year: 2004).*
JP2006266552A Google Patents Translation (Year: 2006).*
JP2013167417A Google Patents Translation (Year: 2013).*
JP2016041633A Google Patents Translation (Year: 2016).*
International Search Report dated Jul. 23, 2019, issued in counterpart Application No. PCT/JP2019/021605, with English Translation. (5 pages).
Written Opinion dated Jul. 23, 2019, issued in counterpart Application No. PCT/JP2019/021605, with English Translation. (19 pages).
Extended European Search Report dated Jun. 17, 2021, issued in counterpart EP Application No. 19818909.4. (11 pages).

* cited by examiner

HYDROTHERMAL TREATMENT DEVICE, BIOMASS FUEL MANUFACTURING PLANT, HYDROTHERMAL TREATMENT METHOD, AND BIOMASS FUEL MANUFACTURING METHOD

TECHNICAL FIELD

The present invention relates to a hydrothermal treatment device, a biomass fuel manufacturing plant, a hydrothermal treatment method, and a biomass fuel manufacturing method.

BACKGROUND ART

Although use of carbon-neutral biomass fuels has gathered attention because of the international carbon dioxide emission regulation, wood pellet that is a representative example of biomass fuels costs high, and solutions for manufacturing various biomass fuels are under review, including reduction of costs and so on.

One of such solutions for manufacturing a biomass fuel is a method for manufacturing a biomass fuel from high-water-content biomass such as sewage sludge. However, high-water-content biomass is not hypergolic, and there is a problem that it is difficult to utilize the biomass as a combustion fuel without drying treatment thereon as pre-treatment. In order to use high-water-content biomass as a fuel, a large amount of energy is required for drying the biomass because it contains much moisture to be dewatered for drying, which therefore requires treatment of impurities contained in the dewatered moisture and increases the cost. Also, in high-water-content biomass, moisture is constrained within biological cell walls, and a low drying efficiency is therefore a problem.

As a method for improving the efficiency of drying of biomass, a method has been known which supplies vapor having a predetermined temperature and pressure to biomass and thus performs hydrothermal treatment (hydrolysis treatment) thereon so that cell walls of the biomass are destroyed to increase the drying efficiency (For example, PLT 1 and PLT 2).

CITATION LIST

Patent Literature

[PTL 1] the Publication of Japanese Patent No. 6190082
[PTL 2] Japanese Unexamined Patent Application, Publication No. 2008-100218

SUMMARY OF INVENTION

Technical Problem

However, according to the apparatuses disclosed in PLT 1 and PLT 2, the hydrothermal treatment is performed by bringing vapor and high-water-content biomass into direct contact. When vapor and high-water-content biomass are brought into direct contact, the vapor is condensed while the high-water-content biomass is being heated, and the condensed water (drain) is mixed into treated matter (high-water-content biomass having undergone the hydrothermal treatment), which increases the moisture contained in the treated matter after the hydrothermal treatment. In order to manufacture a biomass fuel, moisture is required to be separated and removed from the treated matter in a process after the hydrothermal treatment, but, due to the increase of the moisture of the treated matter after the hydrothermal treatment, there is a possibility that the energy required for the separation and removal increases.

The apparatuses disclosed in PLT 1 and PLT 2 require to export the treated matter by reducing the temperature and pressure after the hydrothermal treatment for performing batch processing on the hydrothermal treatment and again import and fill the high-water-content biomass and increase the temperature and pressure, which further causes a problem that the energy required for the separation and removal increases and the productivity cannot be improved because preceding and subsequent treatment times are required in addition to the hydrothermal treatment time.

The present invention has been made in view of such circumstances, and it is an object of the present invention to provide a hydrothermal treatment device, a biomass fuel manufacturing plant, a hydrothermal treatment method, and a biomass fuel manufacturing method that can reduce the water content of treated matter after hydrothermal treatment and thus reduce energy required for separating and removing moisture from the treated matter after the hydrothermal treatment.

Solution to Problem

In order to solve the problem, the hydrothermal treatment device, biomass fuel manufacturing plant, hydrothermal treatment method and biomass fuel manufacturing method of the present invention adopt the following solutions.

A hydrothermal treatment device according to one aspect of the present invention is a hydrothermal treatment device performing hydrothermal treatment by heating high-water-content biomass, the hydrothermal treatment device including a treatment container that stores the high-water-content biomass, a first supply unit that supplies the high-water-content biomass to inside of the treatment container such that a space is formed in a vertical upper part of the treatment container, a stirrer unit that is provided within the treatment container and stirs the high-water-content biomass such that flows in a predetermined direction occur, and at least one heat transfer tube that is disposed within the treatment container so as to cross the predetermined direction and heats the high-water-content biomass with heat of vapor flowing within the heat transfer tube.

In the above-described configuration, high-water-content biomass is heated by heat-exchanging between vapor flowing within the heat transfer tube and the high-water-content biomass stored within the treatment container so that a hydrolysis reaction is caused and the high-water-content biomass is hydrothermally treated. By the hydrothermal treatment, moisture constrained within cell walls of the high-water-content biomass is emitted. When the moisture is emitted, the emitted moisture and the high-water-content biomass are mixed, which improves the flowability of the high-water-content biomass within the treatment container. Thus, the stirring in the stirrer unit can be preferably performed. Therefore, the high-water-content biomass within the treatment container can uniformly have a hydrolysis reaction, and hydrothermal treatment can thus be preferably performed.

Further in the above-described configuration, heat exchange between the vapor and the high-water-content biomass is performed through the heat transfer tube. In other words, the hydrothermal treatment of the high-water-content biomass is performed by heating the high-water-content biomass indirectly through the heat transfer tube, without bringing the high-water-content biomass and the vapor into direction contact. The moisture required for causing the high-water-content biomass to flow is covered by effectively utilizing the moisture contained in the high-water-content biomass. In this manner, the amount of moisture such as vapor to be given to the high-water-content biomass for the hydrothermal treatment can be reduced. Compared with the method that brings the vapor into direct contact, the water content of the treated matter acquired by performing the hydrothermal treatment on the high-water-content biomass (hereinafter, simply called "treated matter") can be reduced. Therefore, when moisture is separated and is removed from the treated matter after the hydrothermal treatment, the energy required for the separation and removal of moisture can be reduced.

By heating the high-water-content biomass indirectly through the heat transfer tube, impurities in the high-water-content biomass are not mixed into the vapor flowing within the heat transfer tube. Thus, the vapor and drained hot water flowing within the heat transfer tube can be used for a drying process in another heat exchanger, and, by increasing the reduced temperature again and supplying them to the heat transfer tube again, the high-water-content biomass can be indirectly heated so that the energy loss can be reduced.

Because a space is formed in a vertical upper part within the treatment container, a desired pressurizing space can be formed within the treatment container. Therefore, hydrothermal treatment can be performed in a stable manner within the treatment container. Because of the space formed in the vertical upper part of the treatment container, the mixing of newly charged high-water-content biomass and high-water-content biomass stored within the treatment container is efficiently performed. Thus, a hydrolysis reaction is promoted so that the hydrothermal treatment can be preferably performed.

Because the high-water-content biomass is stirred by the stirrer unit such that flows in a predetermined direction occur in the high-water-content biomass and the heat transfer tube is disposed so as to cross the flows of the high-water-content biomass in the predetermined direction, more high-water-content biomass can be efficiently brought into contact with the heat transfer tube and can be heated. Thus, a hydrolysis reaction is promoted so that the hydrothermal treatment can be preferably performed. Therefore, the hydrothermal treatment time can be reduced.

In the hydrothermal treatment device according to an aspect of the present invention, the stirrer unit may include a blade unit disposed so as to tilt from a horizontal plane, the blade unit may rotate about an axial direction extending in a vertical up/down direction, the blade unit may have a radial tip disposed so as to be close to an inner periphery surface of the treatment container, and the heat transfer tube may extend in a horizontal direction.

When the blade unit rotates about the axial direction extending in the vertical up/down direction, the high-water-content biomass stored within the treatment container is pressed by the blade unit. Because the blade unit tilts from the horizontal plane, a force moving in the vertical upper or vertical down direction acts on the pressed high-water-content biomass which thus moves within the treatment container, and the high-water-content biomass is preferably stirred.

In the above-described configuration, the heat transfer tube is disposed so as to extend in the horizontal direction. Therefore, the heat transfer tube can be disposed so as to securely cross a counter flow of the high-water-content biomass circulating in the vertical up/down direction. Thus, more high-water-content biomass can be securely brought into contact with the heat transfer tube and be heated. Therefore, the high-water-content biomass within the treatment container can uniformly have a hydrolysis reaction, and hydrothermal treatment can preferably be performed thereon.

Because the blade unit has a radial tip disposed so as to be close to the inner periphery surface of the treatment container, adhesion and hardening of the sludge to the inner periphery surface of the treatment container can be suppressed.

In the above-described configuration, because the blade unit rotates about the axis in the up/down direction, the path area of the blade unit is formed so as to extend in the horizontal direction. On the other hand, the heat transfer tube extends in the horizontal direction. Thus, it is hard for the path area of the blade unit and the heat transfer tube to overlap so that it can be hard for the blade unit and the heat transfer tube to interfere with each other.

In the hydrothermal treatment device according to an aspect of the present invention, the stirrer unit may include a plurality of blade units that rotate about an axial direction extending in a vertical up/down direction, the plurality of blade units may be disposed at equal intervals along a circumferential direction of the axial direction at positions separated by a predetermined distance in a radial direction from the axial direction about which the blade units rotate, and each of the blade units may be disposed so as to tilt at a predetermined angle toward a direction of the rotation from a horizontal plane, the heat transfer tube may extend in a horizontal direction, and the flows in the predetermined direction may be counter flows including flows in the vertical up direction and the vertical down direction.

When the plurality of blade units disposed so as to tilt at a predetermined angle from the horizontal plane rotates about an axis in a vertical up/down direction, flows of the high-water-content biomass that move in both of the vertical up and vertical down directions occur. Each of these flows turns in a substantial U shape near the interface (upper end surface) of the stored high-water-content biomass or the bottom surface of the treatment container and moves in the direction opposite to the direction of the movement until then. In this manner, counter flows of high-water-content biomass circulating in the vertical up/down direction occur within the treatment container so that the high-water-content biomass is preferably stirred. The heat transfer tube is disposed so as to extend in the horizontal direction. Thus, the heat transfer tube can be disposed so as to securely cross the counter flows of the high-water-content biomass circulating in the vertical up/down direction. Therefore, more high-water-content biomass can be securely brought into contact with the heat transfer tube and can be heated. As a result, because the high-water-content biomass within the treatment container can uniformly have a hydrolysis reaction, hydrothermal treatment can preferably be performed thereon.

The hydrothermal treatment device according to an aspect of the present invention may further include a second supply unit that supplies water or vapor to the treatment container such that at least a part of stored matter within the treatment container maintains a predetermined water content.

When the high-water-content biomass is heated because of the contact with the heat transfer tube, moisture thereof evaporates and the water content of the stored matter within the treatment container decreases, there is a possibility that the flowability of the stored matter within the treatment container decreases, but, in the above-described configuration, water or vapor is supplied to the treatment container such that at least a part of the stored matter storing the high-water-content biomass within the treatment container can maintain a predetermined water content. Thus, the decrease of the flowability of the stored matter can be suppressed. Therefore, because, at all times, the flowability can be maintained and preferable stirring can be performed, a uniform hydrolysis reaction is caused so that hydrothermal treatment can be preferably performed. Because the flowability is maintained, the stored matter having undergone the hydrothermal treatment can be ejected easily from the treatment container.

In the hydrothermal treatment device according to an aspect of the present invention, the treatment container may include an outer shell having a body part forming a side surface and a bottom surface and a ceiling part forming a vertical upper surface, and a fixing unit that fixes at least one of the heat transfer tubes to the body part, the ceiling part may be removably fixed to the body part, and the fixing unit may be removably fixed to the body part.

In the above-described configuration, the ceiling part can be opened, or the fixing unit that fixes the heat transfer tube can be removed from the body part of the treatment container. In this manner, by removing the fixing unit from the body part, the heat transfer tube can be accessed. Therefore, maintenance and repair, for example, of the inside of the treatment container and the heat transfer tube can be easily performed.

The hydrothermal treatment device according to an aspect of the present invention may further include a supply chamber that supplies the high-water-content biomass to the treatment container, an ejection chamber from which stored matter stored within the treatment container is ejected, a first switching means that switches between a state that the supply chamber and the treatment container are in communication and a state that the supply chamber and the treatment container are isolated, and a second switching means that switches between a state that the ejection chamber and the treatment container are in communication and a state that the ejection chamber and the treatment container are isolated. In this case, by keeping a temperature and a pressure within the treatment container at a predetermined temperature and pressure, the high-water-content biomass may be supplied from the supply chamber to the treatment container, and the stored matter may be ejected from the treatment container to the ejection chamber.

In the above-described configuration, by keeping a temperature and a pressure within the treatment container at a predetermined temperature and pressure, the supply of the high-water-content biomass from the supply chamber to the treatment container and the ejection of the stored matter from the treatment container to the ejection chamber are performed. With this configuration, so-called continuous treatment of the hydrothermal treatment of the high-water-content biomass can be performed. Thus, the treated matter (acquired by performing the hydrothermal treatment on the high-water-content biomass) can be continuously exported without reducing the temperature within the treatment container. This eliminates the necessity for exporting the treated matter by reducing the temperature and pressure after the hydrothermal treatment, importing and filling the high-water-content biomass again, and increasing the temperature and pressure, the energy loss due to the temperature reduction of the treatment container and treated matter in the hydrothermal treatment device required for preceding and subsequent treatments other than the hydrothermal treatment can be suppressed, and the time required for the preceding and subsequent treatment times other than the hydrothermal treatment time can be suppressed, improving the productivity.

The hydrothermal treatment device according to an aspect of the present invention may further include a control unit that adjusts a speed of rotation of the stirrer unit during hydrothermal treatment within the treatment container such that a temperature difference depending on positions of the high-water-content biomass within the treatment container is within a predetermined temperature difference range.

In the above-described configuration, by the control unit, the number of rotations of the stirrer unit can be adjusted such that a temperature difference depending on positions of the high-water-content biomass within the treatment container is within a predetermined temperature difference range. Thus, a hydrolysis reaction can be promoted, and the hydrothermal treatment can be preferably performed. Therefore, the hydrothermal treatment time can be reduced.

A biomass fuel manufacturing plant according to an aspect of the present invention is a biomass fuel manufacturing plant including the above-described hydrothermal treatment device, the plant including a dewaterer unit that dewaters the high-water-content biomass having undergone hydrothermal treatment in the hydrothermal treatment device, a first separated water channel that guides separated water separated from the high-water-content biomass in the dewaterer unit to the treatment container, a vapor ejection unit that ejects vapor occurring within the treatment container to outside of the treatment container, and a separation treatment unit that separates impurities from the vapor ejected from the vapor ejection unit.

The vapor occurring within the treatment container contains a volatile constituent (such as CH4, benzene and HmSn compound) and impurities contained in the high-water-content biomass. Therefore, in the separation treatment unit, treatment for separating the volatile constituent and impurities is performed on the vapor ejected from the treatment container.

Because the separated water separated in the dewaterer unit also contains a volatile constituent and impurities contained in the high-water-content biomass, the treatment for separating the volatile constituent and impurities is necessary. In the above-described configuration, the separated water separated by the dewaterer unit is guided to the treatment container. Thus, the separated water evaporates within the treatment container, and the resulting vapor is ejected from the vapor ejection unit and is treated in the separation treatment unit. In this manner, because the separated water and the vapor occurring in the treatment container are treated by one separation treatment unit, the structure of the biomass fuel manufacturing plant can be simplified more than a configuration having a separation treatment unit for each of the separated water and the vapor. Therefore, the required space can be saved, and the cost for installing it can be reduced.

The biomass fuel manufacturing plant according to an aspect of the present invention may further include a plurality of branch pipes which are branched off from the first separated water channel. In this case, the plurality of branch pipes may be in communication with different positions in the vertical up/down direction of the treatment container.

In the above-described configuration, because the branch pipes are in communication with different positions in the vertical up/down direction of the treatment container, the separated water can be utilized for purging the stored matter stored within the treatment container.

Therefore, for example, when the branch pipes are connected near an upper surface of the stored matter stored within the treatment container, the separated water can be sprayed to the heat transfer tube disposed near the upper surface to purge the high-water-content biomass, which can suppress the fixing of the high-water-content biomass to the heat transfer tube disposed near the upper surface.

For example, when the branch pipes are connected in vicinity of an ejection port of the treatment container, the separated water is sprayed to the ejection port which may possibly be clogged with the stored matter to purge the stored matter, which can suppress the blockage of the ejection port.

The biomass fuel manufacturing plant according to an aspect of the present invention may further include a blow off pipe that externally ejects a predetermined proportion of separated water separated in the dewaterer unit.

It is preferable not to supply and store, for example, sodium (Na), potassium (K), phosphorus (P) and the like, which are impurity constituents contained in the separated water, to the treatment container and not to increase the density of the impurity constituents. In the above-described configuration, because the separated water is guided to the treatment container, there is a possibility that, as the operation of the plant continues, the impurities are stored and the density of the impurities increases, but because a predetermined proportion of separated water is externally ejected by the blow off pipe, the state that the density of impurities increases can be suppressed. Thus, the crystallization of the impurities can be suppressed. Therefore, an increase of the viscosity of the stored matter due to the crystallization of the impurities within the treatment container can be suppressed, and the promotion of a hydrolysis reaction by the stirring within the treatment container and the ejection of the treated matter from the treatment container can be smoothly performed.

The biomass fuel manufacturing plant according to an aspect of the present invention may further include a boiler that generates vapor with heat of combustion of a charged fuel supplies the generated vapor to the heat transfer pipe, and a first heat exchanger unit that heat-exchanges between the high-water-content biomass having undergone the hydrothermal treatment in the hydrothermal treatment device and boiler exhaust gas ejected from the boiler.

In the above-described configuration, heat exchange is performed between boiler exhaust gas from the boiler that generates vapor to be used in the hydrothermal treatment device and the treated matter having undergone the hydrothermal treatment so that the treated matter acquired by performing the hydrothermal treatment on high-water-content biomass is heated with the exhaust gas. In this manner, because the treated matter having undergone the hydrothermal treatment can be dried by effectively utilizing the heat of the boiler exhaust gas, the energy efficiency of the whole biomass fuel manufacturing plant can be improved compared with the configuration which does not utilize the heat of the boiler exhaust gas.

The biomass fuel manufacturing plant according to an aspect of the present invention may further include a digester to which the high-water-content biomass before being supplied to the treatment container is introduced, a second separated water channel that guides the separated water separated from the high-water-content biomass in the dewaterer unit to the digester, an internal combustion engine that drives by burning fuel gas for the internal combustion engine containing fuel gas ejected from the digester, and a second heat exchanger unit that heat-exchanges between the high-water-content biomass having undergone the hydrothermal treatment in the hydrothermal treatment device and internal combustion engine exhaust gas ejected from the internal combustion engine.

In the above-described configuration, fuel gas is taken out, in the digester, from high-water-content biomass before being supplied to the treatment container, and the internal combustion engine is driven with the fuel gas for the internal combustion engine containing the taken fuel gas. By heat-exchanging between the exhaust gas from the internal combustion engine and the treated matter acquired by performing hydrothermal treatment on high-water-content biomass, the treated matter is heated with the internal combustion engine exhaust gas. In this manner, because the treated matter having undergone the hydrothermal treatment can be dried by effectively utilizing the heat of the exhaust gas from the internal combustion engine, the energy efficiency of the whole biomass fuel manufacturing plant can be improved compared with the configuration which does not utilize the heat of exhaust gas from the internal combustion engine.

By guiding the separated water to the digester, the heat required in the digester is given. In this manner, because potential heat of the separated water separated from the dewaterer unit is effectively utilized, the energy efficiency of the whole biomass fuel manufacturing plant can be improved compared with the configuration which does not utilize the heat of the separated water.

The biomass fuel manufacturing plant according to an aspect of the present invention may further include a boiler that generates vapor with heat of combustion of a charged fuel and supplies the generated vapor to the heat transfer tube, a digester to which the high-water-content biomass before being supplied to the treatment container is introduced, a second separated water channel that guides the separated water separated from the high-water-content biomass in the dewaterer unit to the digester, an internal combustion engine that drives by burning fuel gas for the internal combustion engine containing fuel gas ejected from the digester, and a third heat exchanger unit that heat-exchanges between the high-water-content biomass having undergone the hydrothermal treatment in the hydrothermal treatment device and boiler exhaust gas ejected from the boiler and internal combustion engine exhaust gas ejected from the internal combustion engine.

In the above-described configuration, the heat exchange between the boiler exhaust gas, the internal combustion engine exhaust gas and the high-water-content biomass having undergone hydrothermal treatment is performed by one heat exchanger unit. Therefore, the required space can be saved, and the cost for installing it can be reduced, compared with the configuration in which a heat exchanger unit that heat-exchanges between the boiler exhaust gas and the high-water-content biomass and a heat exchanger unit that heat-exchanges between the internal combustion engine exhaust gas and the high-water-content biomass are separately provided.

The biomass fuel manufacturing plant according to an aspect of the present invention may further include a fourth heat exchanger unit that heat-exchanges between the high-water-content biomass having undergone the hydrothermal treatment in the hydrothermal treatment device and vapor ejected from the heat transfer tube.

In the above-described configuration, the treated matter can be heated with the heat of the vapor ejected from the heat transfer tube. In this manner, because potential heat of the vapor ejected from the heat transfer tube is effectively utilized, the energy efficiency of the whole biomass fuel manufacturing plant can be improved compared with the configuration which does not utilize the heat of the vapor ejected from the heat transfer tube.

The biomass fuel manufacturing plant according to an aspect of the present invention may further include a fifth heat exchanger unit that heat-exchanges between vapor ejected from the heat transfer tube and the separated water ejected from the dewaterer unit.

In the above-described configuration, the separated water can be heated with the heat of the vapor ejected from the heat transfer tube. In this manner, because potential heat of the vapor ejected from the heat transfer tube is effectively utilized, the energy efficiency of the whole biomass fuel manufacturing plant can be improved compared with the configuration which does not utilize the heat of the vapor ejected from the heat transfer tube.

The biomass fuel manufacturing plant according to an aspect of the present invention may further include a high-water-content biomass tank that stores the high-water-content biomass to be supplied to the treatment container, and a sixth heat exchanger unit that heat-exchanges between vapor ejected from the heat transfer tube and the high-water-content biomass within the high-water-content biomass tank.

In the above-described configuration, the high-water-content biomass to be supplied to the treatment container can be heated with the heat of the vapor ejected from the heat transfer tube. In this manner, because potential heat of the vapor ejected from the heat transfer tube is effectively utilized, the energy efficiency of the whole biomass fuel manufacturing plant can be improved compared with the configuration which does not utilize the heat of the vapor ejected from the heat transfer tube.

A hydrothermal treatment method according to an aspect of the present invention is a hydrothermal treatment method performing hydrothermal treatment by heating high-water-content biomass, the hydrothermal treatment method including a supplying step of supplying the high-water-content biomass to inside of a treatment container such that a space is formed in a vertical upper part of the treatment container, a stirring step of, by a stirrer unit provided within the treatment container, stirring the high-water-content biomass such that flows in a predetermined direction occur, and a heating step of heating the high-water-content biomass with vapor flowing within at least one heat transfer tube disposed within the treatment container so as to cross the predetermined direction.

A biomass fuel manufacturing method according to an aspect of the present invention manufactures a biomass fuel by using the hydrothermal treatment method.

Advantageous Effects of Invention

The water content of treated matter after hydrothermal treatment can be reduced, and the energy required for separating and removing moisture from the treated matter after the hydrothermal treatment can be reduced.

DESCRIPTION OF EMBODIMENTS

Embodiments of a hydrothermal treatment device, a biomass fuel manufacturing plant, a hydrothermal treatment method and a biomass fuel manufacturing method according to the present invention are described below with reference to drawings.

In the following description, "up" as in "upper" and "up direction" and "down" in similar expressions indicate "up" and "down" in a vertical direction.

First Embodiment

A first embodiment of the present invention is described below with reference to FIGS. 1 to 5.

Figure 1:
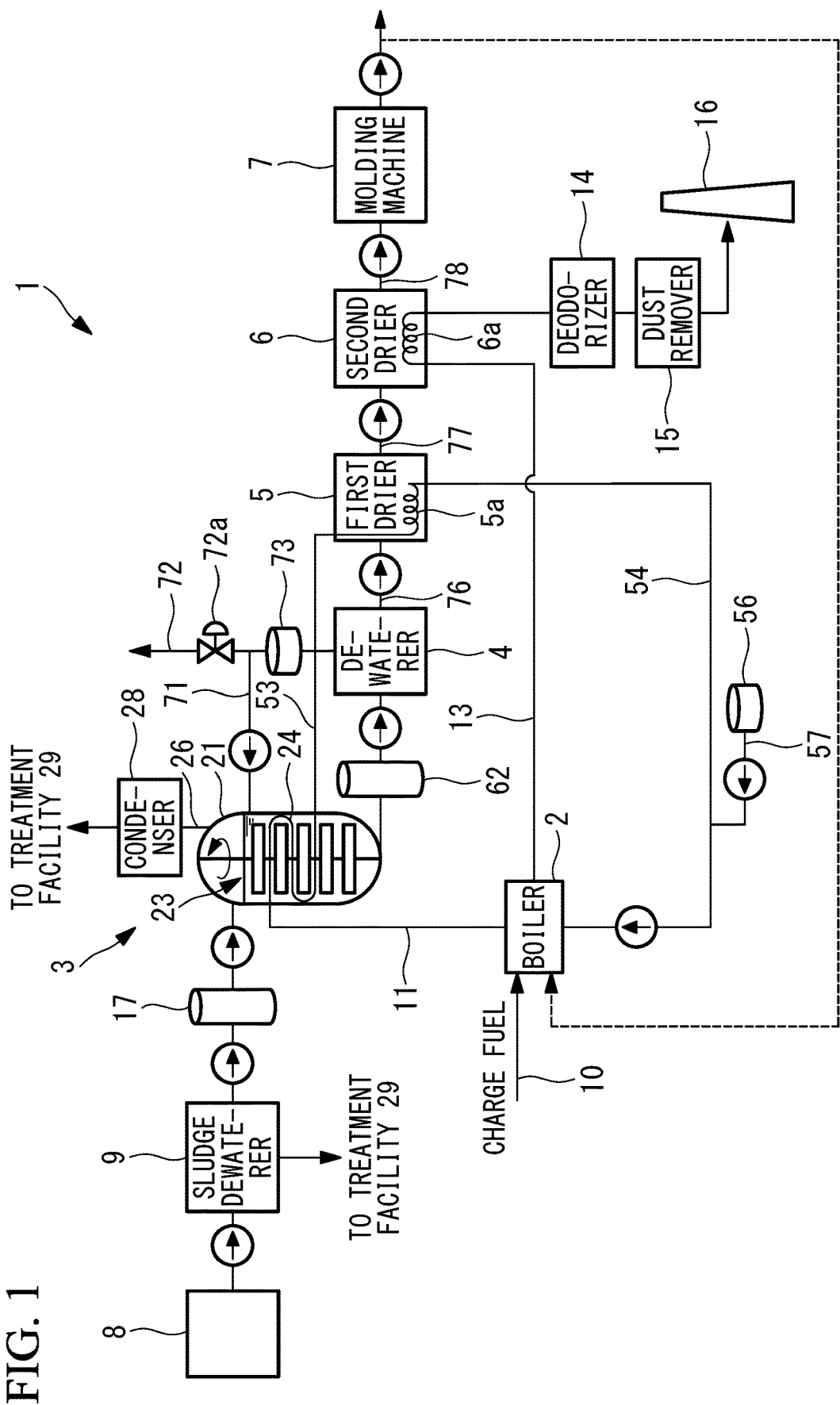
FIG. 1 is a schematic configuration diagram of a biomass fuel manufacturing plant according to a first embodiment of the present invention.

A biomass fuel manufacturing plant 1 according to this embodiment includes, as shown in FIG. 1, a boiler 2 that generates vapor, a hydrothermal treatment device 3 that performs hydrothermal treatment on, for example, sludge (high-water-content biomass) by using heat of the vapor from the boiler 2, a dewaterer (dewaterer unit) 4 that dewaters the sludge (hereinafter, called "treated matter") having undergone the hydrothermal treatment in the hydrothermal treatment device 3, a first drier (fourth heat exchanger unit) 5 and a second drier (first heat exchanger unit) 6 that dries the treated matter dewatered in the dewaterer 4, and a molding machine 7 that molds the treated matter dried in the first drier 5 and the second drier 6 to a biomass fuel. The biomass fuel manufacturing plant 1 further includes a sludge dewaterer 9 that dewaters the sludge from a sewage treatment facility 8 before the sludge is introduced to the hydrothermal treatment device 3, and a sludge storage tank (high-water-content biomass tank) 17 that temporarily stores the sludge dewatered in the sludge dewaterer 9. From the separated water separated in the sludge dewaterer 9, impurities and a volatile constituent (such as $CH_4$, benzene and HmSn compound) contained in the separated water are separated and removed in a treatment plant.

In the following description, although an example in which sewage sludge supplied from the sewage treatment facility 8 is used is described as an example of a raw material of a biomass fuel, the raw material to be treated in the biomass fuel manufacturing plant 1 is not limited to sewage sludge. High-water-content biomass (wetting fuel) is only required.

The boiler 2 includes a furnace (not shown) to which fuel and air (not shown) supplied from a fuel supply pipe 10 are supplied and a burner (not shown) that forms flame within the furnace, and feedwater is heated with heat of combustion acquired by burning the fuel with the burner to generate vapor.

A vapor supply pipe 11 is connected to the boiler 2. The vapor generated in the boiler 2 is supplied to a heat transfer tube 24 in the hydrothermal treatment device 3 through the vapor supply pipe 11. A thermometer 12 that measures a temperature of the vapor flowing within the vapor supply pipe 11 is provided, for example, on an exit side of the boiler 2 or on an entrance side of the heat transfer tube 24 of the vapor supply pipe 11 (refer to FIG. 2). When the temperature of the vapor measured by the thermometer 12 is lower than a predetermined value, the fuel to be supplied to the burner is increased to increase the temperature of the vapor.

A boiler exhaust gas pipe 13 is further connected to the boiler 2. Boiler exhaust gas ejected from the boiler 2 is supplied to the second drier 6 through the boiler exhaust gas pipe 13. The boiler exhaust gas ejected from the boiler 2 has, for example, about 300° C. to 400° C.

The boiler exhaust gas that is a heat source for drying the treated matter in the second drier 6 is ejected from the second drier 6. After the boiler exhaust gas ejected from the second drier 6 is deodorized by a deodorizer 14, impurities such as dust are removed therefrom in a dust remover 15, and the resulting gas is then emitted to the air from a chimney 16.

Figure 2:
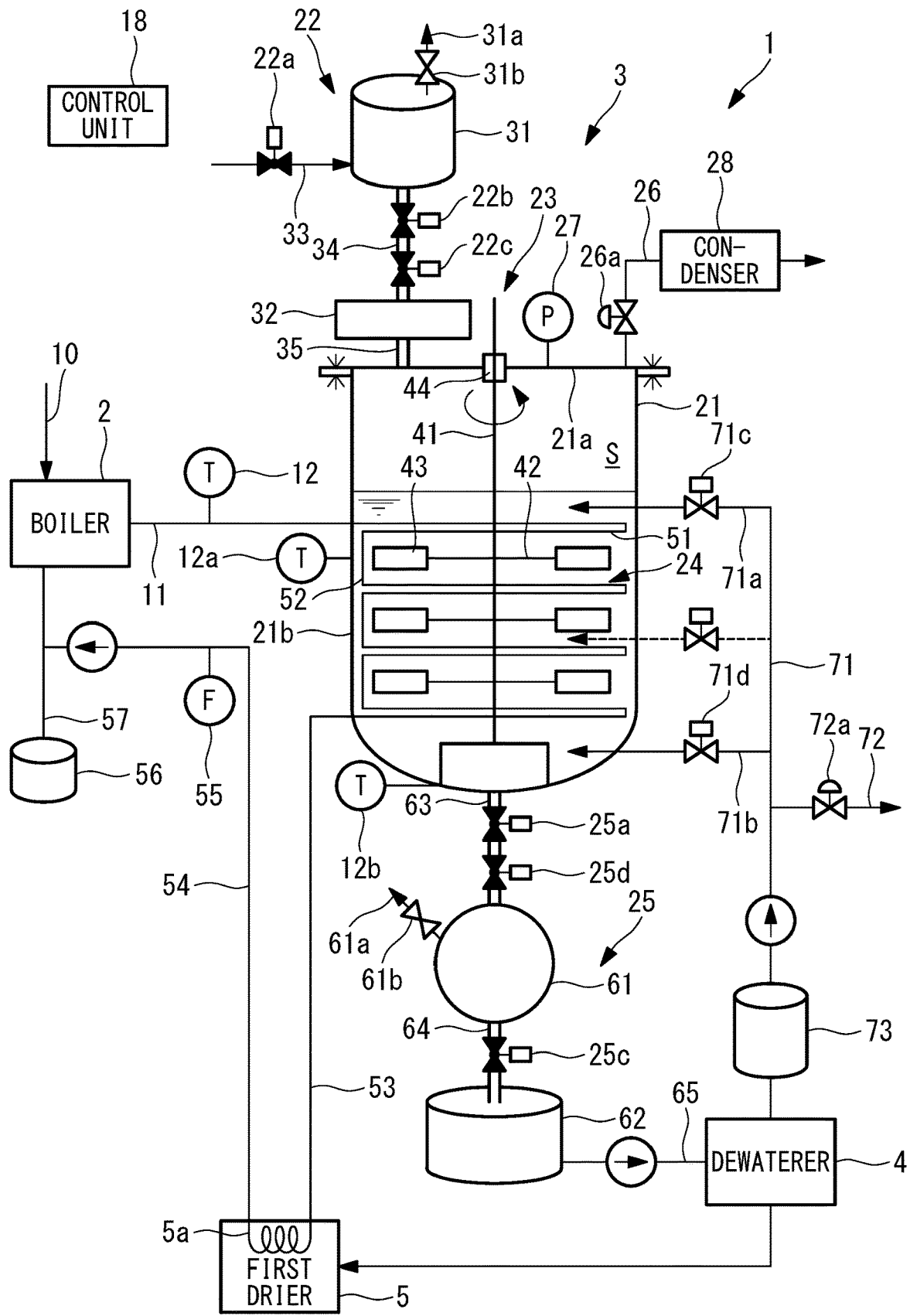
FIG. 2 is a schematic diagram showing a schematic section of a hydrothermal treatment device in FIG. 1 and an overview of a connection between the hydrothermal treatment device and other devices.

The hydrothermal treatment device 3 includes, as shown in FIG. 2, a treatment container 21 within which hydrothermal treatment is performed, a sludge supply unit (first supply unit) 22 that introduces sludge from the sewage treatment facility 8 to the treatment container 21, a stirrer (stirrer unit) 23 that is disposed within the treatment container 21 and stirs sludge stored within the treatment container 21, at least one heat transfer tube 24 that is disposed within the treatment container 21 and within which vapor flows, and a treated-matter ejecting unit 25 that ejects treated matter from the treatment container 21.

In high-water-content biomass such as sludge, moisture may be constrained within biological cell walls, and it is difficult for the constrained moisture to be evaporated, reducing the drying efficiency. In the hydrothermal treatment device 3, because of a hydrolysis reaction using heat of the vapor generated in the boiler 2, cell walls of the high-water-content biomass are destroyed to emit the moisture constrained within the cells. In other words, sludge is hydrothermally treated in the hydrothermal treatment device 3. The hydrothermal treatment is preferably performed on the high-water-content biomass by increasing the pressure and temperature of the high-water-content biomass to acquire a predetermined temperature (150 degrees to 230 degrees) under a condition that the pressure is equal to a predetermined pressure (0.5 Mpa to 3 Mpa).

The treatment container 21 in this embodiment is, for example, a substantially cylindrical pressure container about a vertical up/down direction as an axis and has a lower end part that is a bottom surface and is bent hemispherically. The treatment container 21 has a body part 21b forming a lower end part that is a side surface and a bottom surface of an outer shell and a ceiling part 21a. The ceiling part 21a of the treatment container 21 is formed to have a planer shape and is fixed removably from the body part 21b, and a first vapor ejection pipe 26 and a third sludge pipe 35, which are connected to the ceiling part 21a. The bent low end part has an ejection port (not shown) from which stored matter within the treatment container 21 is ejected to outside and is connected to the treated-matter ejecting unit 25. The treatment container 21 further has the body part 21b forming the outer shell and a tube support (fixing unit) 21c that fixes the heat transfer tube 24 to the body part 21b (refer to FIG. 5). Although the tube support 21c is fixed to the body part 21b, the tube support 21c and the body part 21b are separately provided so that the tube support 21c can be removed from the body part 21b.

Sludge is stored within the treatment container 21. In more detail, while sludge having a water content of about 70% to 90% (80% to 85% more preferably) is stored in a part from a middle area to a lower area in the vertical up/down direction of the space within the treatment container 21, a space S that does not store sludge is formed in an upper area. Inside of the treatment container 21, pressure (about 0.5 Mpa to 3 Mpa) is kept which allows hydrothermal treatment to be preferably performed on the sludge. A pressure gauge 27 that measures a pressure within the treatment container 21 is provided in the treatment container 21, and the measured value is sent to a control unit 18.

The control unit 18 includes, for example, a central processing unit (CPU), a random access memory (RAM), a read only memory (ROM), and a computer readable storage medium. A series of processes for implementing functions is stored in, for example, the storage medium in a program form, and the CPU reads out the program to, for example, the RAM and executes processing and arithmetic operations on information to implement the functions. The program may be pre-installed in the ROM or another storage medium, may be stored in a computer readable storage medium and be provided or may be distributed through a wired or wireless communication means, for example. The computer readable storage medium is a magnetic disk, a magneto-optical disk, a CD-ROM, a DVD-ROM, a semiconductor memory or the like.

The first vapor ejection pipe (vapor ejection unit) 26 that ejects vapor to outside of the treatment container 21 is connected to the ceiling part 21a of the treatment container 21. A flow rate adjustment valve 26a that adjusts the flow rate of the vapor flowing within the first vapor ejection pipe 26 is provided in the first vapor ejection pipe 26. The control unit 18 changes the flow rate adjustment valve 26a to an open state when the pressure within the treatment container 21 measured by the pressure gauge 27 is equal to or higher than a threshold value being a predetermined pressure (such as a predetermined pressure (0.5 Mpa to 3 Mpa) at which the hydrothermal treatment is performed), and the excess vapor within the treatment container 21 is ejected to outside so that the pressure within the treatment container 21 becomes equal to or lower than the predetermined threshold to maintain the pressure state for performing the hydrothermal treatment.

A condenser 28 is provided in the first vapor ejection pipe 26 on a downstream side from the flow rate adjustment valve 26a, and vapor ejected from the treatment container 21 is condensed in the condenser 28. From the condensed water that is condensed, impurities and a volatile constituent (such as CH4, benzene and HmSn compound) contained in the condensed water are separated and are removed in a treatment facility (separation treatment unit) 29. The treatment facility 29 to which the condensed water is introduced may be the same facility as the treatment facility to which the separated water that is separated is introduced from the sludge dewaterer 9 or may be other facility.

The sludge supply unit 22 includes a supply chamber 31 that temporarily stores sludge, a feeder 32 that adjusts the amount of sludge to be supplied into the treatment container 21, a first sludge pipe 33 that supplies sludge to the supply chamber 31, a second sludge pipe 34 that supplies the sludge ejected from the supply chamber 31 to the feeder 32, and a third sludge pipe 35 that introduces the sludge from the feeder 32 into the treatment container 21.

Sludge flows within the first sludge pipe 33, and the first sludge pipe 33 has a downstream end part connected to the supply chamber 31. A first supply side valve 22*a* is provided in the first sludge pipe 33. The first supply side valve 22*a* is a ball valve, for example, that is a valve having a high seal performance which allows sludge to pass through at an open state and allows the pressure within the supply chamber 31 to increase at a closed state.

The supply chamber 31 is a pressure container the internal pressure of which is adjustable, and sludge is supplied thereto from the first sludge pipe 33. The pressure within the supply chamber 31 is increased by supply of pressurized gas (not shown) such as compressed air thereto. A leak channel 31*a* is connected to the supply chamber 31. A leak valve 31*b* is provided in the leak channel 31*a*, and, when the leak valve 31*b* is changed to have an open state, the pressure within the supply chamber 31 can be reduced.

The second sludge pipe 34 connects the supply chamber 31 and the feeder 32. In other words, sludge ejected from the supply chamber 31 is supplied to the feeder 32 through the second sludge pipe 34. A second supply side valve (first switching means) 22*b* and a third supply side valve (first switching means) 22*c* in order from the upstream side are provided in the second sludge pipe 34. Each of the second supply side valve 22*b* and the third supply side valve 22*c* is, for example, a ball valve that is a valve having a high seal performance which allows sludge to pass through at an open state and allows the pressure within the supply chamber 31 to increase at a closed state. In other words, the second supply side valve 22*b* and the third supply side valve 22*c* can switch between a state that the supply chamber 31 and the treatment container 21 are in communication and a state that the supply chamber 31 and the treatment container 21 are isolated from each other. The third supply side valve 22*c* is provided as an auxiliary valve for the second supply side valve 22*b* and prevents stop of the whole hydrothermal treatment device 3 due to a failure of the second supply side valve 22*b*.

The feeder 32 is configured to be able to adjust the amount of sludge to be supplied to the treatment container 21. The third sludge pipe 35 is connected to the feeder 32, and the feeder 32 introduces a predetermined amount of sludge to the treatment container 21 through the third sludge pipe 35.

Operations of the first supply side valve 22*a*, leak valve 31*b*, second supply side valve 22*b*, third supply side valve 22*c* and feeder 32 are controlled by the control unit 18.

The stirrer 23 includes a rotation axis 41 that extends about an axis direction extending in the vertical up/down direction, a plurality of stick units 42 that extend in the horizontal direction from the rotation axis 41 and a blade unit 43 provided at a tip part of each of the stick units 42.

The rotation axis 41 extends so as to be matched with the center axis of the cylindrical treatment container 21 across the substantially all area in the up/down direction of the treatment container 21 and rotates in counterclockwise direction viewed from the top. An upper part of the rotation axis 41 extends through the ceiling part 21*a* of the treatment container 21. In other words, the rotation axis 41 has an upper end part disposed outside of the treatment container 21. The upper end part of the rotation axis 41 is connected to a rotation driving device (not shown) such as a motor, and the rotation axis 41 rotates at a predetermined number of rotations with driving force from the rotation driving device such as a motor. The operation of the rotation driving device is performed by the control unit 18. The rotation driving device may be configured to be able to measure a rotational load (such as a current value) against the number of rotations. The part where the rotation axis 41 extends through the ceiling part 21*a* has a seal structure 44 that is a structure preventing gas within the treatment container 21 from leaking from the through part. The seal structure 44 may be, for example, a lip seal of elastic resin or may be a structure having a labyrinth seal in which pressured gas is introduced from an external opening of the labyrinth seal.

Figure 3:
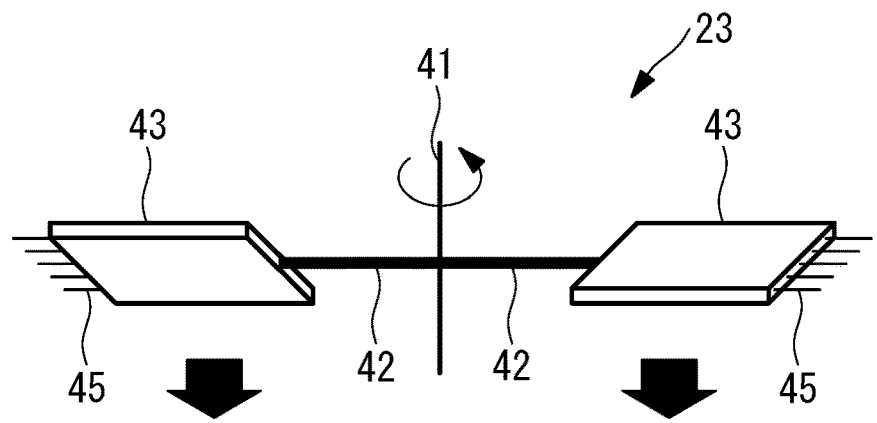
FIG. 3 is a schematic front view showing a stirrer in FIG. 2.

The stick units 42 are stick-shaped members each extending a predetermined distance in the horizontal direction from the rotation axis 41. In this embodiment, the stick units 42 are fixed at a plurality of positions (three positions, for example, in this embodiment) in the direction of extension of the rotation axis 41, and, as shown in FIG. 3, at the fixed positions of the stick units 42, two stick units 42 having an equal length are provided at intervals of 180 degrees along the circumferential direction of the outer circumferential surface of the rotation axis 41 by a predetermined radial distance (such as 30% to 80% of the distance from the rotation axis 41 to the inner periphery surface of the treatment container 21). In other words, in this embodiment, because two stick units 42 are provided at each of the three positions in the direction of extension of the rotation axis 41, a total of six stick units 42 are formed.

As shown in FIGS. 2 and 3, a plate-shaped blade unit 43 is provided at a radial tip of each of the stick units 42. The plate-shaped blade unit 43 is provided such that a surface part thereof tilts from a horizontal plane at a predetermined angle (such as 5 degrees to 40 degrees) with respect to the direction of rotation. In more detail, according to this embodiment, a front part in the direction of movement of the blade unit 43 (that is, the direction of rotation of the rotation axis 41) tilts to be positioned upper than a rear part and form the predetermined angle from the horizontal plane. Each of the blade units 43 has a radial tip (that is, end part on the opposite side of the end to which the stick unit 42 is fixed) which is disposed closely to but not in contact with the inner periphery surface of the treatment container 21.

Figure 4:
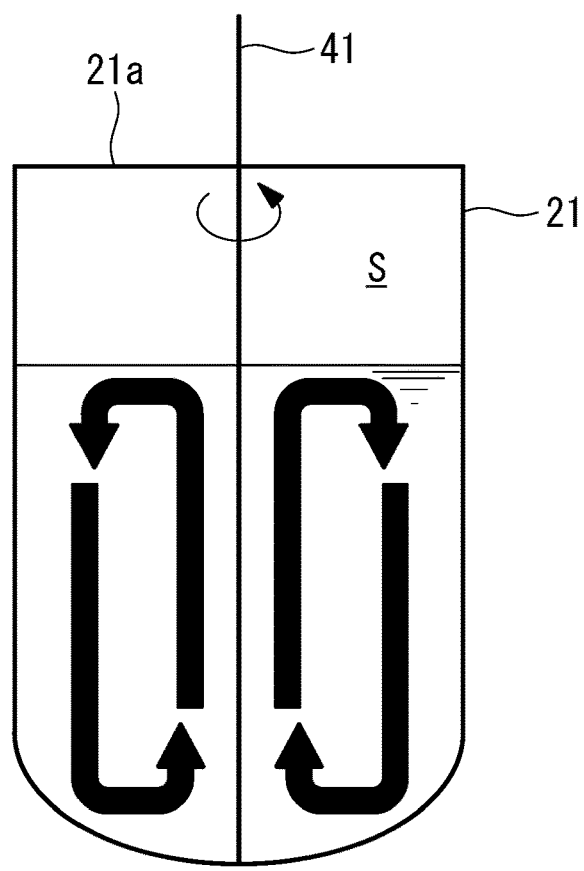
FIG. 4 is a diagram showing flows of stored matter within a treatment container in FIG. 2.

Here, flows of the stored matter within the treatment container 21 are described with reference to FIG. 4. When the blade units 43 rotate about the rotation axis 41, the blade units 43 press the stored matter stored within the treatment container 21. In more detail, stored matter in a radially outer area from the rotation axis 41 within the treatment container 21 of the stored matter stored within the treatment container 21 is pressed. Because the front part in the direction of movement of the blade units 43 tilts to be positioned upper than the rear part, a force that moves downward acts on the pressed stored matter. Therefore, as shown in FIG. 4, the stored matter pressed by the blade units 43 moves downward (refer to the arrows in FIG. 3) along the inner periphery surface of the treatment container 21. The stored matter having moved downward turns in a substantial U shape near the bottom surface of the treatment container 21 and moves upward along the center axis. In this manner, counter flows of the stored matter circulating in the up/down direction occur in the treatment container 21. The counter flows are formed so as to be substantially symmetrical with respect to the rotation axis 41 in all area within the treatment container 21. Because of the counter flows, the stored matter stored within the treatment container 21 is efficiently stirred.

The flows of the stored matter caused within the treatment container 21 may be different flows. For example, counter flows may be caused which move downward along the rotation axis 41 and move upward along the inner periphery surface of the treatment container 21. In order to cause such counter flows, the blade units 43 may be tilted such that the front parts in the direction of movement of the rotation are positioned lower than the rear parts, or the direction of rotation of the rotation axis 41 may be reversed.

As shown in FIG. 3, an elastic buffer 45 (such as a brush) is provided at the tip of each of the blade units 43. The blade units 43 have the radial tips disposed closely to but not in contact with the inner periphery surface of the treatment container 21 so that sludge is suppressed from being attached to and hardened on the inner periphery surface of the treatment container 21. The elastic buffer 45 is disposed closely to or in contact with the inner periphery surface of the treatment container 21. Providing the elastic buffer 45 can further prevent sludge from being adhered to and hardened on the inner periphery surface of the treatment container 21.

The numbers of the stick units 42 and the blade units 43 are not limited to the numbers in the description above. Having described above the configuration in which the stick units 42 are fixed at three positions in the direction of extension of the rotation axis 41, the stick units 42 may be fixed at a single fixing position or a plurality of fixing positions other than the three positions. FIG. 1 shows an example in which the stick units 42 and the blade units 43 are fixed at five positions.

The number of stick units 42 to be fixed to the fixing positions is not limited to the number described above. Although the example in which two stick units 42 are provided at intervals of 180 degrees is described, the number of stick units 42 to be provided may be, for example, a single stick unit 42 or may be three or more stick units 42. When a plurality of stick units 42 are provided, the stick units 42 are desirably provided at equal intervals along the circumferential direction of the outer circumferential surface of the rotation axis 41 in order to improve the stirring ability. In other words, for example, when four stick units 42 are provided at one fixing position, the stick units 42 are desirably disposed in the shape of a cross viewed from the top.

Figure 5:
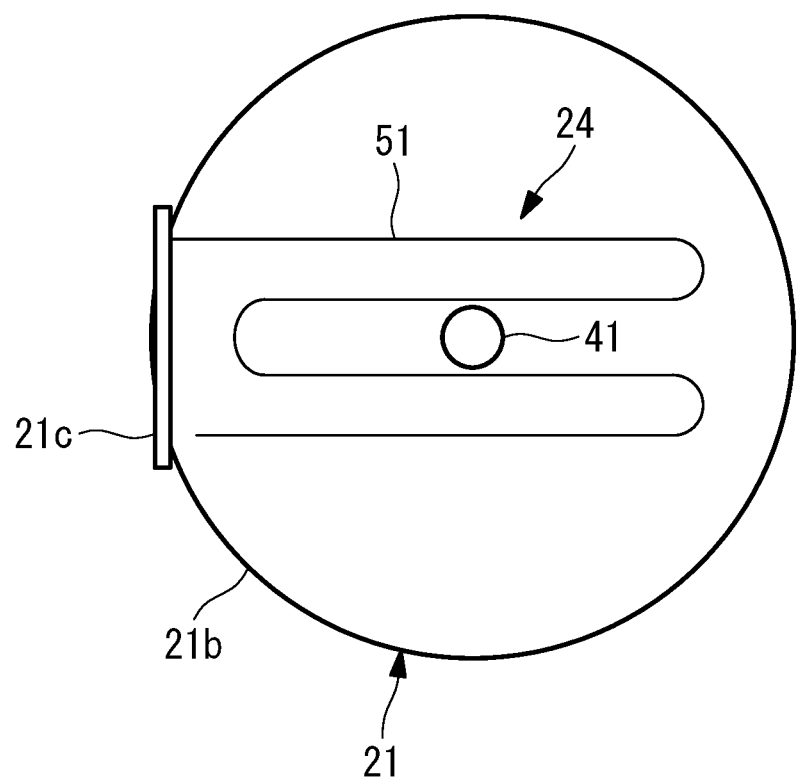
FIG. 5 is a schematic diagram showing a lateral end face of the treatment container in FIG. 2.

The heat transfer tube 24 is connected to the vapor supply pipe 11, and vapor generated in the boiler 2 is supplied to the heat transfer tube 24 through the vapor supply pipe 11. As shown in FIG. 5, at least one of the heat transfer tubes 24 is fixed to the tube support 21c and is removably fixed to the body part 21b of the treatment container 21 through the tube support 21c. When the heat transfer tube 24 has, for example, a spiral coil shape to increase the heating area, the heat transfer tube 24 may be provided near the bottom surface within the treatment container 21 because it is difficult to removably fix the heat transfer tube 24 to the body part 21b of the treatment container 21 through the tube support 21c.

In this embodiment, as shown in FIG. 2, the heat transfer tube 24 includes a plurality of (in this embodiment, four as an example) horizontal heat transfer tubes 51 extending in the horizontal direction and vertical heat transfer tubes 52 extending in the vertical direction and serially connecting the plurality of horizontal heat transfer tubes 51 and is configured to be able to supply vapor as one continuous pipe.

The plurality of horizontal heat transfer tubes 51 may have a heat transfer tube header that connects the plurality of horizontal heat transfer tubes 51 in parallel and can supply and gather vapor, and an adjustment valve (not shown) may be provided between the plurality of horizontal heat transfer tubes 51 and the heat transfer tube header (not shown) so as to enable adjustment of the vapor supply balance among the plurality of horizontal heat transfer tubes 51.

Because counter flows of the stored matter circulating in the up/down direction occur within the treatment container 21 as described above, the horizontal heat transfer tubes 51 are disposed so as to cross the flows.

The plurality of heat transfer tubes 51 are disposed side by side at predetermined intervals in the up/down direction to shape a layer structure. In more details, the plurality of horizontal heat transfer tubes 51 are disposed such that the horizontal heat transfer tube 51 and the blade unit 43 of the stirrer 23 are provided alternately in the up/down direction.

As shown in FIG. 5, each of the plurality of horizontal heat transfer tubes 51 has a shape extending from the tube support 21c to the opposite side across the rotation axis 41 and turning a plurality of number of times. In other words, the horizontal heat transfer tube 51 has a W-shape viewed from the top. The horizontal heat transfer tubes 51 are disposed at positions not interfering with the stirrer 23 where the horizontal heat transfer tubes 51 and the stirrer 23 are not physically brought into contact with each other even when the stirrer 23 rotates about the rotation axis 41.

Because the horizontal heat transfer tube 51 at the bottom of the plurality of horizontal heat transfer tubes 51 is near the bottom surface of the treatment container 21, is therefore not provided between the blade units 43 and does not easily interfere with the stirrer 23, the horizontal heat transfer tube 51 may have a spiral coil shape. Thus, the heating area is increased, and the efficiency of heat transfer of the heat transfer tube 24 can be improved.

Each of the vertical heat transfer tubes 52 connects the adjacent horizontal heat transfer tubes 51. The vertical heat transfer tube 52 may connect to the horizontal heat transfer tube 51 fixed to the tube support 21c outside the treatment container 21. The vertical heat transfer tubes 52 may be disposed so as not to interfere with the stirrer 23 in a gap formed between the tips of the blade units 43 and the inner periphery surface of the treatment container 21.

As shown in FIGS. 1 and 2, the heat transfer tube 24 has a downstream end connected to a second vapor ejection pipe 53. The second vapor ejection pipe 53 is connected to a first heat exchanger 5a disposed within the first drier 5 and guides the vapor and partially drained hot water ejected from the heat transfer tube 24 to the first drier 5. The first heat exchanger 5a provided in the first drier 5 heat-exchanges between the vapor and drained hot water ejected from the heat transfer tube 24 and the treated matter exported from the treatment container 21, heats the treated matter and cools the vapor and the drained hot water. In this case, a large part of the cooled vapor is condensed, and the hot water having a reduced temperature is mixed with the condensed water. The condensed water that is condensed is supplied to the boiler 2 as feedwater through a feedwater supply pipe 54 connecting the first drier 5 and the boiler 2. The indirect heat exchange performed both in the treatment container 21 and the first drier 5 prevents mixing of impurities and a volatile constituent (CH4, benzene and HmSn compound) to the feedwater. A flowmeter 55 (refer to FIG. 2) that measures the flow rate of the feedwater (condensed water) flowing within the feedwater supply pipe 54 is provided in the feedwater supply pipe 54. A pipe 57 connected to a feedwater tank 56 merges with an intermediate position of the feedwater supply pipe 54. When the flow rate measured by the flowmeter 55 is less than a predetermined rate, feedwater from the feedwater tank 56 is added.

The treated-matter ejecting unit 25 includes an ejection chamber 61 that temporarily stores the treated matter, a treated-matter tank 62 that stores the treated matter to be supplied to the dewaterer 4, a first treated-matter pipe 63 that supplies the treated matter ejected from the treatment container 21 to the ejection chamber 61, a second treated-matter pipe 64 that supplies the treated matter ejected from the ejection chamber 61 to the treated-matter tank 62, and a third treated-matter pipe 65 that introduces the treated matter from the treated-matter tank 62 to the dewaterer 4.

The treated matter flows within the first treated-matter pipe 63, and the first treated-matter pipe 63 has an upstream end connected to the ejection port of the treatment container 21 and a downstream end connected to the ejection chamber 61. A first ejection side valve (second switching means) 25a and a second ejection side valve (second switching means) 25b in order from the upstream side are provided in the first treated-matter pipe 63. Each of the first ejection side valve 25a and the second ejection side valve 25b is, for example, a ball valve that is a valve having a high seal performance which allows sludge to pass through at an open state and allows the pressure within the ejection chamber 61 to increase at a closed state. In other words, the first ejection side valve 25a and the second ejection side valve 25b can switch between a state that the ejection chamber 61 and the treatment container 21 are in communication and a state that the supply chamber 31 and the treatment container 21 are isolated from each other. The second ejection side valve 25b is provided as an auxiliary valve for the first ejection side valve 25a and prevents stop of the whole hydrothermal treatment device 3 due to a failure of the first ejection side valve 25a.

The ejection chamber 61 is a pressure container the internal pressure of which is adjustable, and the treated matter is supplied thereto from the treatment container 21 through the first treated-matter pipe 63. A leak channel 61a is connected to the ejection chamber 61. A leak valve 61b is provided in the leak channel 61a, and, when the leak valve 61b is changed to have an open state, the pressure within the ejection chamber 61 can be reduced.

The second treated-matter pipe 64 connects the ejection chamber 61 and the treated-matter tank 62. A third ejection side valve 25c is provided in the second treated-matter pipe 64. The third ejection side valve 25c is, for example, a ball valve that is a valve having a high seal performance which allows sludge to pass through at an open state and allows the pressure within the supply chamber 31 to increase at a closed state.

The third treated-matter pipe 65 connects the treated-matter tank 62 and the dewaterer 4.

The dewaterer 4 dewaters the sludge (that is, the treated matter) resulting from destruction of the cell walls therein with a hydrolysis reaction in the hydrothermal treatment device 3 by separating the sludge into a solid content and a liquid content (separated water). As described above, because, although moisture is constrained within the biological cell walls in high-water-content biomass such as sludge, the cell walls are destroyed with a hydrolysis reaction in the hydrothermal treatment and the moisture constrained within the cell is emitted, efficient dewatering treatment can be performed by the dewaterer 4. In the dewaterer 4, the treated matter is dewatered to acquire a water content of about 50% or lower, for example. The dewaterer 4 dewaters the treated matter by, for example, pressing the treated matter by using a pressing machine (not shown). The dewaterer 4 may dewater the treated matter by other methods. For example, a centrifuge may be used to dewater the treated matter.

The operations of the first ejection side valve 25a, second ejection side valve 25b, leak valve 61b, third ejection side valve 25c and dewaterer 4 are performed by the control unit 18.

As shown in FIG. 2, the separated water separated in the dewaterer 4 is ejected to a separated water pipe (second supply unit, first separated water channel) 71, and a large part of the separated water is supplied to the treatment container 21 through a separated water tank 73, and a part thereof is ejected from a blow off pipe 72, which is described below. At an intermediate position, the separated water pipe 71 has a plurality of branch pipes such as two of a first branch pipe 71a and a second branch pipe 71b in this embodiment, and the pipes are connected to different positions in the up/down direction of the treatment container 21 so that spraying therefrom is performed into the treatment container 21.

The first branch pipe 71a is connected to a part near an upper surface of the stored matter stored within the treatment container 21 (a proper position at 0% to 50% of the height distance from the upper surface to the lower end part of the treatment container 21 such as a part near the horizontal heat transfer tube 51 at the top to which sludge introduced into the treatment container 21 is easily adhered). Through this connection, the separated water is sprayed to the horizontal heat transfer tube 51 at the top, and the sludge is purged, which can suppress the fixing of the sludge. A first flow rate adjustment valve 71c that adjusts the flow rate of the separated water flowing within the first branch pipe 71a is provided in the first branch pipe 71a.

The second branch pipe 71b is connected to, for example, a part near the ejection port of the treatment container 21. Through this connection, the separated water is sprayed to the ejection port which may possibly be clogged with the stored matter, and the stored matter settled and piled in the lower end part is purged, which can suppress the blockage of the ejection port. A second flow rate adjustment valve 71d that adjusts the flow rate of the separated water flowing within the second branch pipe 71b is provided in the second branch pipe 71b.

In order to supply the separated water for the purpose of cleaning to a part other than the horizontal heat transfer tube 51 at the top and the ejection port, the separated water pipe 71 may have two or more branches as indicated by the broken line in FIG. 2.

The blow off pipe 72 branches off from the separated water pipe 71 on the upstream side from the branch positions of the first branch pipe 71a and the second branch pipe 71b. The blow off pipe 72 has, for example, a pipe diameter designed such that separated water of a predetermined proportion of 1% to 10% (more preferably 1% to 5%) of the separated water ejected from the dewaterer 4 flows at all times in the blow off pipe 72. In other words, the remaining separated water that does not branch off to the blow off pipe 72 is supplied to the treatment container 21.

A flow rate adjustment valve 72a that adjusts the flow rate of the separated water flowing within the blow off pipe 72 is provided in the blow off pipe 72. The flow rate adjustment valve 72a has a degree of opening to be adjusted in accordance with the density of impurity constituents contained in the separated water, such as sodium (Na), potassium (K) and phosphorus (P) in plant cells resulting from destruction of vegetable fiber (plant cell walls and cell membranes) with a hydrolysis reaction of the sludge and thus adjusts the flow rate of the separated water flowing within the blow off pipe 72. This can suppress storage of the impurity constituents contained in the separated water supplied to the treatment container 21 and crystallization of the stored impurity constituents as a result of an increased density of the impurity constituents. Therefore, an increase of the viscosity of the stored matter due to the crystallization of the impurity constituents within the treatment container 21 can be suppressed, and the promotion of a hydrolysis reaction by the stirring within the treatment container 21 and the ejection of the treated matter from the bottom part of the treatment container 21 can be smoothly performed.

The treated matter resulting from the dewatering of the separated water in the dewaterer 4 is supplied to the first drier 5 through a fourth treated-matter pipe 76. The first drier 5 dries the treated matter dewatered in the dewaterer 4 with the first heat exchanger 5a provided within the first drier 5 by using heat of the vapor ejected from the treatment container 21.

The treated matter dried in the first drier 5 is supplied to the second drier 6 through a fifth treated-matter pipe 77. The second drier 6 dries the treated matter dried in the first drier 5 with the second heat exchanger 6a provided within the second drier 6 by using heat of the exhaust gas from the boiler 2 such that, for example, the water content is in a range of 10% to 20% or lower.

The treated matter dried in the second drier 6 is supplied to the molding machine 7 through a sixth treated-matter pipe 78. The molding machine 7 molds the treated matter dried in the second drier 6 to a biomass fuel. The biomass fuel molded in the molding machine 7 is supplied to a supply destination. A part of the molded biomass fuel may be supplied to the boiler 2, as indicated by the broken line in FIG. 1, and may be a part of the fuel for the boiler 2.

Figure 6:
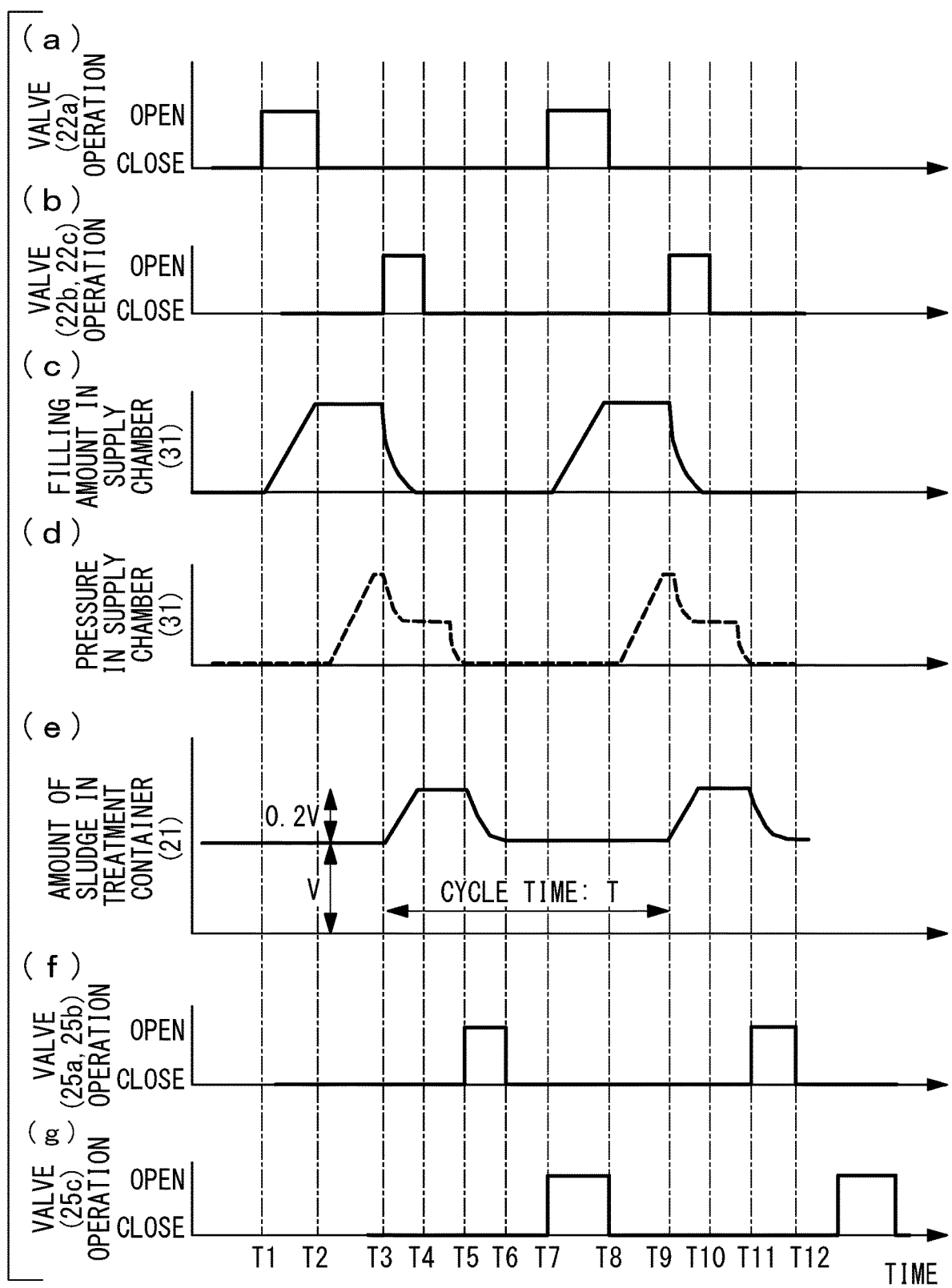
FIG. 6 is a time chart showing open/closed states of valves, filling amounts and pressure in a supply chamber, and storage amounts of the treatment container.

Next, operations of the hydrothermal treatment device 3 according to this embodiment are described with reference to a timing chart in FIG. 6. FIG. 6 has a horizontal axis indicating change of time. FIG. 6 has a vertical axis (a) indicating open/closed states of the first supply side valve 22a, a vertical axis (b) indicating open/closed states of the second supply side valve 22b and the third supply side valve 22c. FIG. 6 further has a vertical axis (c) indicating filling amounts of sludge in the supply chamber 31, a vertical axis (d) indicating pressure within the supply chamber 31, and a vertical axis (e) indicating an amount of sludge (amount of stored matter) within the treatment container 21. FIG. 6 further has a vertical axis (f) indicating open/closed states of the first ejection side valve 25a and the second ejection side valve 25b, and a vertical axis (g) indicating open/closed states of the third ejection side valve 25c.

Initially at T1, the supply chamber 31 and the treatment container 21 are separated (isolated) from each other. At T1, the first supply side valve 22a is changed to have an open state (refer to (a)). Because, when the first supply side valve 22a has an open state at T1, sludge is supplied into the supply chamber 31, the filling amount in the supply chamber 31 increases from T1 to T2 (refer to (c)). At T2 when sufficient sludge is filled into the supply chamber 31, the first supply side valve 22a is changed to have a closed state (refer to (a)). After the inside of the supply chamber 31 is tightly closed, the pressure within the supply chamber 31 is increased from T2 to T3 (refer to (d)). The pressure within the supply chamber 31 is increased by supplying pressurized gas such as compressed air. Upon timing of T3 when the pressure within the supply chamber 31 becomes equal to or higher than the pressure within the treatment container 21, the pressure increasing is stopped, and the second supply side valve 22b and the third supply side valve 22c are changed to have an open state (refer to (b)).

When the second supply side valve 22b and the third supply side valve 22c are changed to have an open state at T3, the supply chamber 31 and the treatment container 21 become in communication, and, because the sludge within the supply chamber 31 moves to the treatment container 21, the filling amount in the supply chamber 31 decreases, and the amount of sludge in the treatment container 21 increases, from T3 to T4 (refer to (c) and (e)). At that time, because the tightness of the supply chamber 31 is released, the pressure of the supply chamber 31 decreases to a predetermined value (refer to (d)).

At T4, the second supply side valve 22b and the third supply side valve 22c are changed to have a closed state, and the supply chamber 31 and the treatment container 21 are separated from each other. From T4 to T5, the treatment container 21 has a tightly closed state, and predetermined temperature and pressure states are maintained within the treatment container 21. At that time, in order for the supply chamber 31 to be able to receive the next sludge, the leak valve 31b provided in the leak channel 31a is changed to have an open state, and the pressure within the supply chamber 31 is reduced to a pressure equal to the atmospheric pressure (refer to (d)).

From T1 to T5, the ejection chamber 61 and the treatment container 21 are separated from each other. Upon timing of T5, the first ejection side valve 25a and the second ejection side valve 25b are changed to have an open state (refer to (f)).

When the first ejection side valve 25a and the second ejection side valve 25b are changed to have an open state at T5, the ejection chamber 61 and the treatment container 21 become in communication, and, because the treated matter at the bottom part within the treatment container 21 moves to the ejection chamber 61, the amount of stored matter within the treatment container 21 decreases from T5 to T6 (refer to (e)). Upon timing of T6 when a predetermined amount of the treated matter is ejected from the treatment container 21, the first ejection side valve 25a and the second ejection side valve 25b are changed to have a closed state (refer to (f)). The ejection chamber 61 and the treatment container 21 are separated from each other. Next, the third ejection side valve 25c is changed to have an open state at T7, and the treated matter is ejected from the ejection chamber 61 (refer to (g)). Upon timing of T8 when the ejection of the treated matter ends, the third ejection side valve 25c is changed to have a closed state.

Upon timing of T7, the first supply side valve 22a is again changed to have an open state, and preparation for supply of sludge to the treatment container 21 is started again (refer to (a)). After that, the operations from T1 to T8 are repeated. The hydrothermal treatment device 3 according to this embodiment operates in this manner.

In the hydrothermal treatment device 3, as described above, because switching can be performed between a state that each of the supply chamber 31 and the ejection chamber 61 is in communication with the treatment container 21 and a state that each of them is separated from the treatment container 21, it can be said that the supply of sludge and the ejection of the treated matter can be continuously performed by maintaining the temperature and pressure within the treatment container 21 at a predetermined temperature and pressure.

Preferably, a predetermined time required up to determination of completion of the hydrothermal treatment on the ejected treated matter under hydrolysis conditions (the temperature and pressure within the treatment container 21) and against the amount of supply of new sludge and the amount of ejection of the treated matter is checked by, for example, an experiment in advance, and the timing of the supply of sludge and the timing of the ejection of the treated matter are managed based on the checked predetermined time.

According to this embodiment, the case is described where the amount of sludge to be introduced by one operation is set to, for example, 20% of the stored matter within the treatment container 21. In other words, when the amount of stored matter within the treatment container 21 is V, the amount of sludge to be introduced by one operation is 0.2V. The cycle time T that is a time from a time when sludge is introduced to the treatment container 21 to a time when the next sludge is introduced (the time from T3 to T9 in FIG. 6) is set to five minutes, for example. Thus, the time required for replacing all of the stored matter within the treatment container 21 is derived from the following expression (1) and is equal to 25 minutes. In other words, the time for performing the hydrothermal treatment on the sludge introduced into the treatment container 21 and ejecting the result as the treated matter from the treatment container 21 to outside is equal to 25 minutes, and a proper time can be secured as a general hydrolysis reaction time.

$$(V/0.2V) \times T \tag{1}$$

The sludge supply timing and the treated matter ejection timing may be managed based on changes of the rotational load against the number of rotations provided in the rotation driving device for the stirrer 23. Because the viscosity of the stored matter decreases as the hydrothermal treatment advances, the sludge supply timing and the treated matter ejection timing may be managed by monitoring a decrease from a predetermined value of the rotational load (current) against the number of rotations of the rotation driving device for the stirrer 23.

The measurement of and the operation relating to the number of rotations of the rotation driving device for the stirrer 23 and the rotational load (such as a current value) may be performed by a number-of-rotations control unit provided within the control unit 18.

According to this embodiment, as described above, the state that each of the supply chamber 31 and the ejection chamber 61 is in communication with the treatment container 21 and the state that each of the supply chamber 31 and the ejection chamber 61 is separated from the treatment container 21 are provided for performing the hydrothermal treatment so that the supply of sludge and the ejection of the treated matter are continuously performed by keeping the temperature and pressure within the treatment container 21 at a predetermined temperature and pressure. In other words, according to this embodiment, the hydrothermal treatment performed in the hydrothermal treatment device 3 is so-called continuous treatment. Because the hydrothermal treatment is continuous treatment in this manner and the ejection of the treated matter can thus be performed without reducing the temperature within the treatment container 21, the energy loss due to the temperature reduction of the treatment container 21 and the treated matter in the hydrothermal treatment device 3 can be suppressed.

Although the operations of the hydrothermal treatment device 3 are described above with reference to the example in which the second supply side valve 22b and the third supply side valve 22c perform the same operation, the second supply side valve 22b and the third supply side valve 22c may not perform the same operation. Because the third supply side valve 22c is provided as an auxiliary valve for the second supply side valve 22b, the open/closed state of the channel may be switched only with the second supply side valve 22b by causing the third supply side valve 22c to basically maintain its open state. When an abnormality occurs in the second supply side valve 22b, the third supply side valve 22c may be operated to switch the open/closed state of the channel. The same is true for the first ejection side valve 25a and the second ejection side valve 25b, and the first ejection side valve 25a and the second ejection side valve 25b may not perform the same operation as described above.

Next, operations of the whole biomass manufacturing plant are described.

First, a method for manufacturing a biomass fuel from sludge by using the biomass manufacturing plant is described.

The sludge supplied from the sewage treatment facility 8 to the treatment container 21 in the hydrothermal treatment device 3 (supplying step) is indirectly heated (heating step) through the heat transfer tube 24 with the heat of the vapor from the boiler 2 under a predetermined pressure within the treatment container 21 so that the hydrothermal treatment is performed on the sludge and cell walls are destroyed by a hydrolysis reaction. At that time, the stored matter within the treatment container 21 is stirred and is fragmented by the stirrer 23 (stirring step).

When the hydrothermal treatment is performed, the pressure within the treatment container 21 is caused to be a predetermined pressure (0.5 Mpa to 3 Mpa), and the temperature within the treatment container 21 is kept at a predetermined temperature (150° C. to 230° C.), by the control unit 18. The distribution of temperature within the treatment container 21 is measured by a plurality of thermometers 12a and 12b provided in the up/down direction within the treatment container 21. The rotational speed of the stirrer 23 is adjusted such that a temperature difference between the temperature measured by the thermometer 12a that measures a temperature of an upper part of the stored matter stored within the treatment container 21 (near a middle part of the treatment container 21) and a temperature measured by the thermometer 12b that measures a temperature of a lower part (near the bottom of the treatment container 21) can be within a predetermined temperature difference range (5° C. to 10° C.). The pressure within the treatment container 21 increases with vapor pressure occurring from sludge that is heated. After the pressure reaches a predetermined pressure (0.5 Mpa to 3 Mpa), the degree of opening of the flow rate adjustment valve 26a provided in the first vapor ejection pipe 26 is adjusted to maintain the pressure constant.

The treated matter having undergone the hydrothermal treatment in the hydrothermal treatment device 3 and being ejected from the hydrothermal treatment device 3 is dewatered in the dewaterer 4, and a liquid content (separated water) is separated from the treated matter. The water content of the treated matter dewatered in the dewaterer 4 is about 50%. The treated matter dewatered in the dewaterer 4 is supplied to the first drier 5 and is dried, in the first drier 5, with heat of the vapor and partially drained hot water ejected from the heat transfer tube 24 in the hydrothermal treatment device 3. The treated matter dried in the first drier 5 is next supplied to the second drier 6 and is dried with heat of the boiler exhaust gas from the boiler 2. The water content of the treated matter dried in the second drier 6 is in a range from 10% to 20% or lower. The treated matter dried in the second drier 6 is supplied to the molding machine 7 and is molded to a biomass fuel, and, in this manner, a biomass fuel is manufactured. The biomass fuel molded in the molding machine 7 is supplied to a supply destination. A part of the molded biomass fuel may be supplied to the boiler 2 as indicated by the broken line in FIG. 1 and may be used as a part of the fuel for the boiler 2.

The separated water seperated in the dewaterer 4 is ejected from the dewaterer 4, and a large part thereof (about 90% to 99% of the whole separated water) is supplied to the treatment container 21 through the separated water tank 73, and a part (1% to 10%) thereof is ejected from the blow off pipe 72. At that time, in order to secure the flowability of the stored matter stored within the treatment container 21, the separated water is supplied to the treatment container 21 such that the water content (such as about 80% to 85%) that allows continuous maintenance of the flowability of the stored matter within the treatment container 21 can be maintained. In more detail, the amount of the separated water to be supplied to the treatment container 21 is equal to the amount of excess vapor ejected from the first vapor ejection pipe 26 as a result of the occurrence of vapor from heated sludge so that the water content of the stored matter within the treatment container 21 can be maintained to a desired value.

A part of the separated water (1% to 10% of the whole separated water, more preferably, 1% to 5%) separated in the dewaterer 4 flows within the blow off pipe 72 at all times and is blown into the boiler 2 and is burnt. The separated water may undergo treatment that removes impurities and the like therefrom in a treatment facility, without supplying to the boiler 2.

The flow of sludge and so on in the biomass fuel manufacturing plant 1 according to this embodiment is described above.

Next, a flow of the vapor in the biomass fuel manufacturing plant 1 is described.

The vapor generated in the boiler 2 is supplied to the heat transfer tube 24 through the vapor supply pipe 11. The supply of the vapor from the boiler 2 to the heat transfer tube 24 is controlled based on the measured temperature of the thermometer 12 provided in the vapor supply pipe 11 (such as at the exit of the boiler) where the vapor to be supplied is saturated vapor or superheated vapor of, for example, about 0.8 Mpa to 10 Mpa and has a supply energy equivalent temperature (20 degrees to 50 degrees, set in accordance with the amount of sludge to be introduced to the treatment container 21 by also using a latent heat content of the vapor) as a hydrolysis temperature (maintained temperature within the treatment container 21). The flow rate of the feedwater returning from the heat transfer tube 24 may be adjusted with, for example, a feedwater pump such that the temperature within the treatment container 21 can be maintained to a predetermined temperature (preferably a temperature that can cause a hydrolysis reaction, such as 150 degrees to 230 degrees).

The vapor supplied to the heat transfer tube 24 flows within the heat transfer tube 24 and indirectly heats the stored matter within the treatment container 21 through the heat transfer tube 24. The vapor and partially drained hot water ejected from the heat transfer tube 24 are introduced through the second vapor ejection pipe 53 to the first heat exchanger 5a disposed within the first drier 5. The vapor and hot water introduced to the first heat exchanger 5a indirectly heat the treated matter by performing heat exchange with the treated matter with the first heat exchanger 5a, and the vapor is cooled and is condensed and, after the temperature of the hot water is reduced, the resulting water is mixed to the condensed water. The condensed water that is condensed is ejected from the first drier 5. Because the indirect heat exchange is performed both in the treatment container 21 and the first drier 5, impurities and a volatile constituent (CH4, benzene and HmSn compound) are not mixed to the feedwater. The condensed water ejected from the first drier 5 is again supplied to the boiler 2 as feedwater through the feedwater supply pipe 54.

The flow of the vapor and so on in the biomass fuel manufacturing plant 1 according to this embodiment is described above.

According to this embodiment, following operating effects are provided.

According to this embodiment, sludge is heated by heat-exchanging between vapor flowing within the heat transfer tube 24 and the sludge stored within the treatment container 21 so that a hydrolysis reaction is caused and the sludge is hydrothermally treated. By the hydrothermal treatment, moisture constrained within cell walls of the high-water-content biomass is emitted. When the moisture is emitted, the emitted moisture and the high-water-content biomass are mixed, which improves the flowability of the high-water-content biomass within the treatment container 21. Thus, the stirring in the stirrer unit can be preferably performed. Therefore, the sludge within the treatment container 21 can uniformly have a hydrolysis reaction, and the hydrothermal treatment can thus be preferably performed.

According to this embodiment, heat exchange between the vapor and the sludge is performed through the heat transfer tube 24. In other words, the hydrothermal treatment of the sludge is performed by heating the sludge indirectly through the heat transfer tube 24, without bringing the sludge and the vapor into direction contact. The moisture required for causing the stored matter within the treatment container 21 to flow is covered by effectively utilizing the moisture contained in the sludge. In this manner, the amount of moisture such as vapor to be given to the sludge for the hydrothermal treatment can be reduced. Compared with a method that brings the vapor into direct contact, the content of moisture of the treated matter after the hydrothermal treatment can be reduced. Therefore, when moisture is separated and is removed from the treated matter after the hydrothermal treatment, the energy required for separation and removal of the moisture can be reduced.

By heating the sludge indirectly through the heat transfer tube 24, impurities contained in the sludge are not mixed into the vapor flowing within the heat transfer tube 24. Thus, the vapor and drained hot water flowing within the heat transfer tube 24 can be used for a drying process in another heat exchanger (such as the first drier 5), and the sludge can be indirectly heated by increasing the reduced temperature of the vapor and drained hot water again and supplying them to the heat transfer tube 24 again so that the energy loss can be reduced.

Because a space is formed in a vertical upper part within the treatment container 21, a desired pressurizing space can be formed within the treatment container 21. Therefore, the hydrothermal treatment can be performed in a stable manner within the treatment container 21. Because of the space S formed in the vertical upper part of the treatment container 21, the mixing of newly charged sludge and sludge stored within the treatment container 21 is efficiently performed. Thus, a hydrolysis reaction is promoted so that the hydrothermal treatment can be preferably performed.

According to this embodiment, because the blade units 43 tilt from the horizontal plane, counter flows of the high-water-content biomass circulating in the up/down direction occur within the treatment container 21. Further according to this embodiment, the horizontal heat transfer tube 51 in the heat transfer tube 24 is disposed so as to extend in the horizontal direction. Therefore, the heat transfer tube 24 is disposed so as to cross the counter flows of the high-water-content biomass circulating in the up/down direction. Thus, more stored matter can be brought into contact with the heat transfer tube 24 and be heated. Therefore, a hydrolysis reaction is promoted, and the hydrothermal treatment can preferably be performed. As a result, the hydrothermal treatment time can be reduced.

According to this embodiment, because the blade units 43 rotate about the axis in the vertical up/down direction, the path area of the blade units 43 is formed so as to extend in parallel with the horizontal plane. On the other hand, the horizontal heat transfer tubes 51 extend in the horizontal direction. Thus, the path area of the blade unit 43 and the horizontal heat transfer tubes 51 are in parallel, and the path area of the blade units 43 and the horizontal heat transfer tubes 51 do not overlap so that the interference between the blade units 43 and the horizontal heat transfer tubes 51 can be prevented. Because the vertical heat transfer tubes 52 are provided between the tips of the blade unit 43 and the inner periphery surface of the treatment container 21, the interference between the blade units 43 and the vertical heat transfer tubes 52 can be prevented.

Vapor occurs because of the heating of the sludge by the heat transfer tube 24 within the treatment container 21, and, with the vapor pressure, the pressure within the treatment container 21 is maintained to a predetermined pressure, and excess vapor is ejected. As an example, when hydrothermal treatment is performed under conditions with 220° C. and 2.5 Mpa, 15% to 30% of the moisture of the sludge is ejected as vapor. In this manner, the water content of the stored matter may decrease from the water content thereof when introduced to the treatment container 21, and the water content of the stored matter may decrease to about 50%. When the water content of the stored matter within the treatment container 21 decreases, the flowability of the stored matter within the treatment container 21 decreases, possibly causing problem in stirring the stored matter or ejecting the treated matter from the treatment container 21.

According to this embodiment, the separated water is supplied to the treatment container 21 such that the stored matter within the treatment container 21 can maintain a predetermined water content. Thus, a decrease of the flowability of the stored matter can be prevented. Therefore, because, at all times, the flowability can be maintained and preferable stirring can be performed, a uniform hydrolysis reaction can be caused. Because the flowability is maintained, the stored matter can easily be ejected from the treatment container 21.

According to this embodiment, the tube support 21c that fixes the ceiling part 21a and the heat transfer tube 24 can be removed from the body part 21b of the treatment container 21. In this manner, by removing the tube support 21c from the body part 21b, the heat transfer tube 24 can be accessed. Because the ceiling part 21a can be opened, the heat transfer tube 24 can more easily be accessed. Therefore, maintenance and repair, for example, of the inside of the treatment container 21 and the heat transfer tube 24 can be easily performed.

According to this embodiment, by the control unit 18, the number of rotations of the stirrer 23 can be adjusted such that a temperature difference depending on positions of the stored matter within the treatment container 21 is within a predetermined temperature difference range (5° C. to 10° C.) Thus, the distribution of temperature of the stored matter within the treatment container 21 is suppressed, and a hydrolysis reaction is promoted so that the hydrothermal treatment can preferably be performed. Therefore, the hydrothermal treatment time can be reduced.

The vapor occurring within the treatment container 21 contains a volatile constituent (such as CH4, benzene and HmSn compound) and impurities contained in the sludge. Therefore, in the separation treatment unit, treatment for separating the volatile constituent and impurities is performed on the vapor ejected from the treatment container 21.

Because the separated water separated in the dewaterer 4 also contains a volatile constituent and impurities contained in the sludge, treatment for separating the volatile constituent and impurities is required to perform. According to this embodiment, the separated water separated in the dewaterer unit is guided to the treatment container 21. Thus, the separated water evaporates within the treatment container 21, and the resulting vapor is ejected from the vapor ejection unit and is treated in the separation treatment unit. In this manner, because the separated water and the vapor occurring in the treatment container 21 are treated by one separation treatment unit, the structure of the biomass fuel manufacturing plant 1 can be simplified more than a configuration having a separation treatment unit for each of the separated water and the vapor. Therefore, the required space can be saved, and the cost for installing it can be reduced.

According to this embodiment, by heat-exchanging between the exhaust gas from the boiler 2 that generates vapor to be utilized in the hydrothermal treatment device 3 and the treated matter having undergone the hydrothermal treatment, the treated matter is heated. In this manner, because the treated matter having undergone the hydrothermal treatment can be dried by utilizing the heat of the exhaust gas from the boiler 2, the energy efficiency of the whole biomass fuel manufacturing plant 1 can be improved compared with the configuration which does not utilize the heat of the exhaust gas from the boiler 2.

In a case where the hydrothermal treatment is performed in a batch-wise manner, because a complicated process is performed including a step of filling sludge into the treatment container 21 in the hydrothermal treatment device 3 every time, a step of increasing the temperature and pressure of the treatment container 21 in which sludge is filled, a step of holding the state and performing hydrothermal treatment thereon, a step of reducing the pressure in the treatment container 21, and a step of ejecting the treated matter, energy and time are required. In particular, there is a problem regarding treatment speeds that, while a small proportion of the time required for one batch is used for the "holding step" in which the hydrothermal treatment is performed, the time for the other process associated therewith is longer.

According to this embodiment, the hydrothermal treatment performed in the hydrothermal treatment device 3 is so-called continuous treatment. In other words, the treated matter (sludge in which cell walls are destroyed by the hydrothermal treatment) can be exported without reducing the temperature within the treatment container 21. Thus, the loss of the charged energy due to the temperature reduction of the treatment container 21 and the treated matter in the hydrothermal treatment device 3 can be suppressed. Compared with the case where the batch processing is performed, because the step of increasing the temperature and pressure and the step of reducing the pressure can be eliminated, the hydrothermal treatment can be efficiently performed.

Due to a hydrolysis reaction of the sludge, vegetable fiber (plant cell walls and cell membranes) is destroyed, and elements such as sodium (Na), potassium (K) and phosphorus (P) in plant cells are mixed into the moisture. Because the moisture of the sludge becomes vapor by being heated and is ejected from the treatment container 21 and because the separated water dewatered from the treated matter is returned to the treatment container 21, for example, the impurities (Na, K, P) are stored within the treatment container 21, and the density of the impurities increases. Thus, because the impurities are crystalized, which increases the viscosity of the stored matter, there is a possibility that a problem occurs in stirring the stored matter within the treatment container 21 or ejecting the treated matter, for example. Also, there is a possibility that the heat transfer efficiency between the stored matter and the heat transfer tube 24 decreases.

According to this embodiment, the blow off pipe 72 is provided so that 1% to 10% (more preferably 1% to 5%) of separated water ejected from the dewaterer 4 is ejected all times. Thus, storage and condensation of the impurities within the treatment container 21 can be suppressed, and an increase of the viscosity of the stored matter can be suppressed.

[Modification 1]

A first modification of the first embodiment is described below with reference to FIG. 7.

Figure 7:
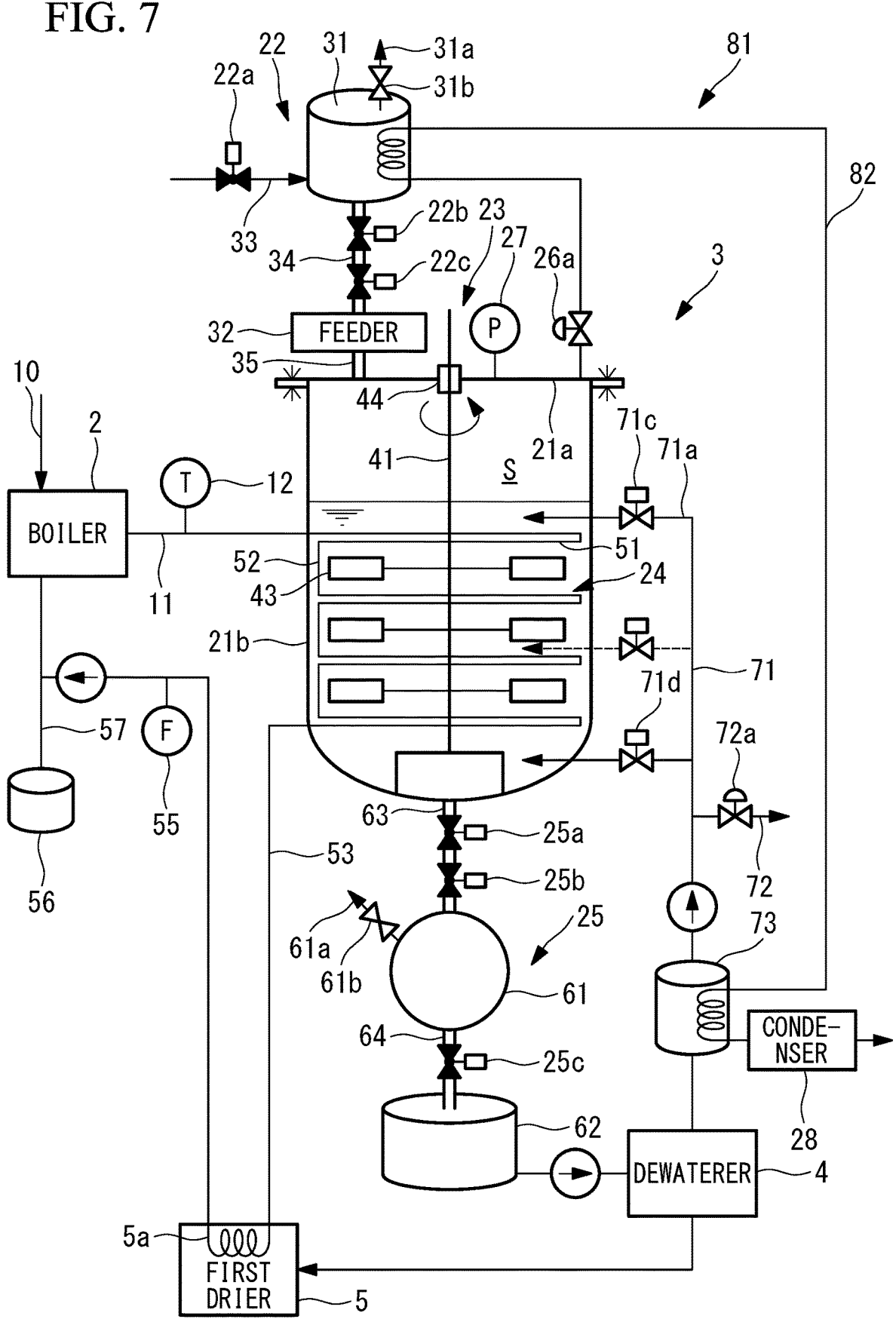
FIG. 7 is a schematic diagram showing a modification of FIG. 2.

As shown in FIG. 7, a biomass fuel manufacturing plant 81 according to this modification is different from the first embodiment in the structure of a vapor ejection pipe in which vapor ejected from the treatment container 21 flows. Like numbers refer to like constituents in the first embodiment and this modification, and detailed description thereof is omitted.

A vapor ejection pipe 82 according to this modification is connected to the supply chamber 31 and the separated water tank 73 in order from the upstream side. In more detail, the vapor ejection pipe 82 is connected to the heat exchanger provided within the supply chamber 31 and the heat exchanger provided in the separated water tank 73. The vapor ejected from the treatment container 21 flows within the vapor ejection pipe 82, and heat exchange with the sludge within the supply chamber 31 is performed in the heat exchanger provided within the supply chamber 31. Through this heat exchange, the sludge can be heated with the heat of the vapor, and the vapor can be cooled.

The vapor having heated the sludge in the supply chamber 31 undergoes heat exchange with the separated water in the heat exchanger provided within the separated water tank 73. Through this heat exchange, the separated water can be heated with the heat of the vapor, and the vapor can further be cooled.

The vapor having heated the separated water is introduced to the condenser 28. Because the cooling of the vapor is advanced, the cooling ability in the condenser 28 can be alleviated.

According to this modification, by utilizing the heat of the vapor ejected from the treatment container 21, the sludge to be supplied to the treatment container 21 can be preheated, and the separated water to be supplied to the treatment container 21 can be preheated. Therefore, the energy efficiency of the whole biomass fuel manufacturing plant 81 can be improved compared with the configuration that does not utilize the heat of the vapor.

The vapor ejected from the treatment container 21 may be guided to another device, and the heat of the vapor may be utilized. For example, heat exchange may be performed between the vapor ejected from the treatment container 21 and the sludge dewatered in the sludge dewaterer 9 to preheat the sludge.

[Modification 2]

A second modification of the first embodiment is described below.

A biomass fuel manufacturing plant according to this modification is different from the first embodiment in that a temperature difference measuring means that measures a temperature difference between a vapor temperature at the entrance of the heat transfer tube 24 and a vapor temperature at the exit of the heat transfer tube 24 and a rotational speed changing means that changes the rotational speed of the rotation axis 41 of the stirrer 23 based on the temperature difference measured by the temperature difference measuring means are provided. Like numbers refer to like constituents in the first embodiment and this modification, and detailed description thereof is omitted.

The temperature difference measuring means includes, for example, the thermometer 12 on the entrance side that measures the vapor temperature at the entrance of the heat transfer tube 24, an exit-side thermometer (not shown) that measures the vapor temperature at the exit of the heat transfer tube 24, and a calculating unit that calculates a temperature difference based on the temperature measured by the thermometer 12 on the entrance side and the temperature measured by the exit-side thermometer.

The rotational speed changing means includes, for example, a determining unit that, if the temperature difference calculated by the calculating unit is equal to or lower than a predetermined value, determines that the heat exchange in the heat transfer tube 24 is not preferably performed and soil is adhered to the heat transfer tube 24, and a number-of-rotations control unit that increases the number of rotations of the rotation driving device such as a motor that drives the rotation axis 41 based on information from the determining unit. The determining unit and the number-of-rotations control unit may be provided within the control unit 18.

The heat transfer tube 24 may have a decreased heat transfer performance because, for example, sludge is burnt and is adhered thereto. According to this modification, because the temperature difference measuring means is provided, the decrease of the heat transfer performance of the heat transfer tube 24 can be easily grasped. Because the rotational speed changing means is provided, when the heat transfer performance of the heat transfer tube 24 decreases, the rotational speed of the stirrer 23 can be increased to increase the speed of a flow of the stored matter so that the performance of the heat transfer from the heat transfer tube 24 to the stored matter can be recovered.

Instead of the rotational speed changing means, a soot blower that sprays the separated water separated in the dewaterer 4 to the heat transfer tube 24 may be provided. With this configuration, when the heat transfer performance decreases, the separated water can be sprayed to the heat transfer tube 24 to clean the surface of the heat transfer tube 24 and thus recover the heat transfer performance.

[Modification 3]

A third modification of the first embodiment is described below.

A biomass fuel manufacturing plant according to this modification is different from the first embodiment in that a supplying means that supplies additional water or vapor into the treatment container 21 upon start of the operation of the hydrothermal treatment device 3. Like numbers refer to like constituents in the first embodiment and this modification, and detailed description thereof is omitted.

Although the sludge before a hydrolysis reaction has a water content of about 80% to 85%, which is apparently high, the sludge is solid matter (sponge-like, containing water) and has a low flowability. In other words, because, before a hydrolysis reaction, the moisture of the sludge is constrained within the cell walls, the sludge has a low flowability though the water content is high. Therefore, there is a possibility that the stirring of the stored matter cannot preferably be performed upon start of the operation of the hydrothermal treatment device 3 that is before a hydrolysis reaction.

According to this modification, because additional water or vapor is supplied into the treatment container 21 upon start of the operation of the hydrothermal treatment device 3, the flowability of the stored matter can be improved even before a hydrolysis reaction. When a hydrolysis reaction starts, no additional water or vapor is supplied because the constrained moisture is emitted and the flowability can be maintained with the moisture of the stored matter itself.

A dedicated channel may be provided for the additional water or vapor to be supplied, or a liquid content remaining within the treatment container 21 may be kept upon the last stop, and the kept liquid content may be supplied.

Second Embodiment

Figure 8:
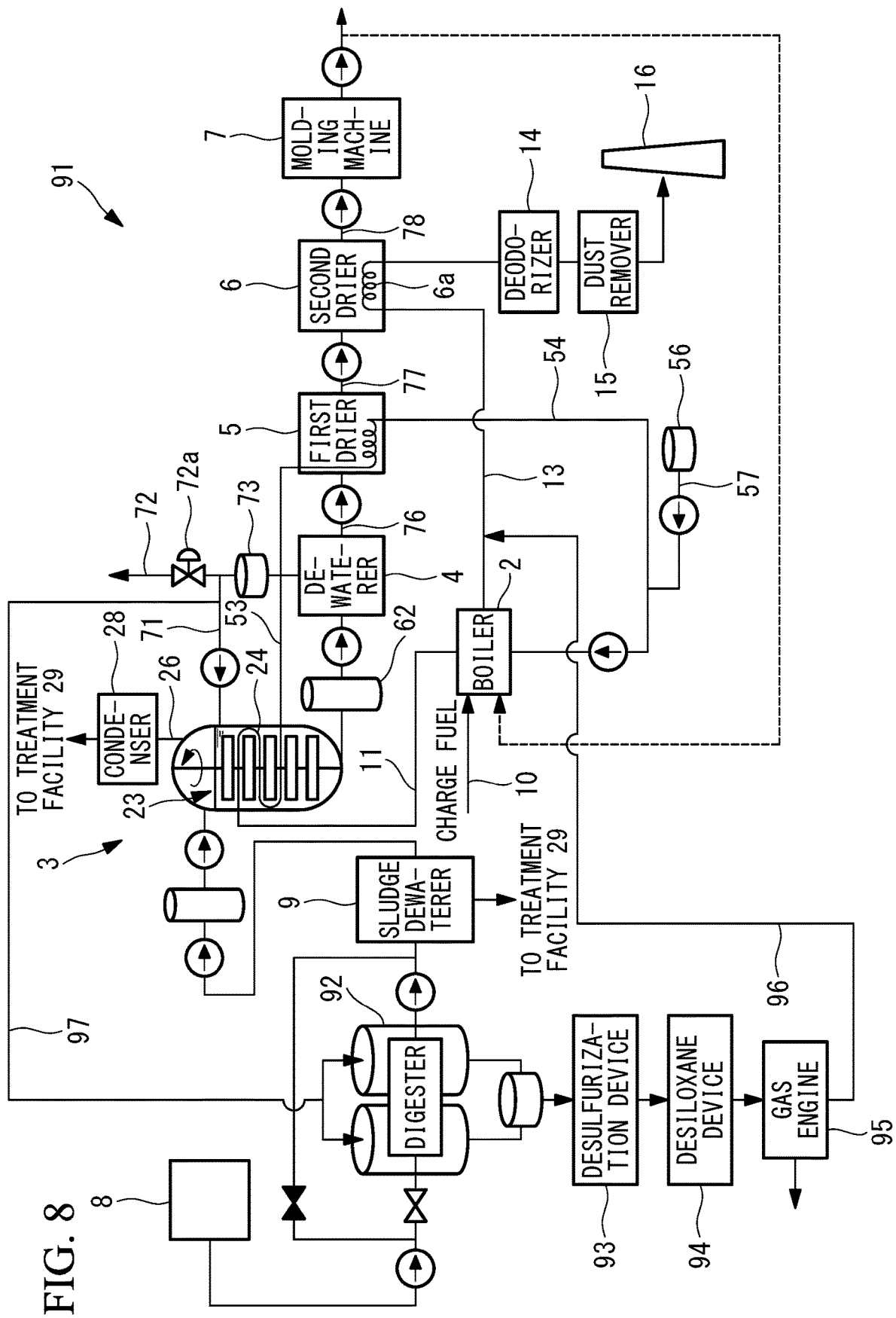
FIG. 8 is a schematic configuration diagram of a biomass fuel manufacturing plant according to a second embodiment of the present invention.

A second embodiment of the present invention is described below with reference to FIG. 8.

A biomass fuel manufacturing plant 91 according to this embodiment is different from the first embodiment mainly in that a digester 92, a desulfurization device 93, a desiloxane device 94, and a gas engine (internal combustion engine) 95 are provided. Like numbers refer to like constituents in the first embodiment and the second embodiment, and detailed description thereof is omitted.

The digester 92 is provided on the upstream side from the sludge dewaterer 9 and receives sludge supplied from the sewage treatment facility 8. The digester 92 performs digestive treatment on the supplied sludge to generate volatile gas such as methane. The separated water separated from the dewaterer 4 is supplied to the digester 92 through a separated water pipe (second separated water channel) 97, and the heat of the separated water is used as a heat source for the digestive treatment.

The volatile gas generated in the digester 92 is supplied to the desulfurization device 93 and is desulfurized. The volatile gas (fuel gas) desulfurized in the desulfurization device 93 is supplied to the desiloxane device 94, and siloxane is removed therefrom. The volatile gas from which siloxane has been removed is supplied to the gas engine 95. Although fuel gas for the internal combustion engine is supplied to the gas engine 95, the gas engine 95 drives by using and burning the volatile gas as a part or all of the fuel gas for the internal combustion engine, and internal combustion engine exhaust gas is ejected from the gas engine 95 in response to the driving. The internal combustion engine exhaust gas ejected from the gas engine 95 has about 150° C. to 400° C., for example.

The internal combustion engine exhaust gas ejected from the gas engine 95 flows within a gas engine exhaust gas pipe 96. The gas engine exhaust gas pipe 96 merges with the boiler exhaust gas pipe 13. In other words, the internal combustion engine exhaust gas merges with the boiler exhaust gas pipe 13 through the gas engine exhaust gas pipe 96 and is used as a heat source for drying the treated matter in the second heat exchanger 6a provided in the second drier 6 (third heat exchanger unit). The internal combustion engine exhaust gas used as the heat source for drying the treated matter in the second drier 6 is ejected from the second drier 6. After the internal combustion engine exhaust gas ejected from the second drier 6 is deodorized in the deodorizer 14, impurities such as dust are removed therefrom in the dust remover 15, and the resulting gas is then emitted to the air from the chimney 16.

Instead of causing the gas engine exhaust gas pipe 96 to merge with the boiler exhaust gas pipe 13, each of them may be independently connected to the second drier 6. The boiler exhaust gas pipe 13 may be connected to the second drier (first heat exchanger unit) 6, the gas engine exhaust gas pipe 96 may be connected to a third drier (second heat exchanger unit) that is different from the second drier 6, the heat exchange with the treated matter may be performed in the third drier, and the treated matter may be dried. The third drier is not shown.

According to this embodiment, following operating effects are provided.

According to this embodiment, volatile gas is taken out, in the digester 92, from sludge before being supplied to the treatment container 21, and the gas engine 95 is driven by using the taken volatile gas as a part or all of the fuel gas for the internal combustion engine. By heat-exchanging between the internal combustion engine exhaust gas from the gas engine 95 and the treated matter having undergone the hydrothermal treatment, the treated matter is heated with the exhaust gas and is dried. In this manner, because the treated matter having undergone the hydrothermal treatment can be dried by utilizing the heat of the internal combustion engine exhaust gas from the gas engine 95, the energy efficiency of the whole biomass fuel manufacturing plant 91 can be improved compared with the configuration which does not utilize the heat of the exhaust gas from the gas engine 95.

By guiding the separated water that is separated from the dewaterer 4 to the digester 92, the heat required in the digester 92 is given. In this manner, because the heat of the separated water separated from the dewaterer 4 is utilized, the energy efficiency of the whole biomass fuel manufacturing plant 91 can be improved compared with the configuration which does not utilize the heat of the separated water.

[Modification]

A modification of the second embodiment is described below with reference to FIG. 9.

Figure 9:
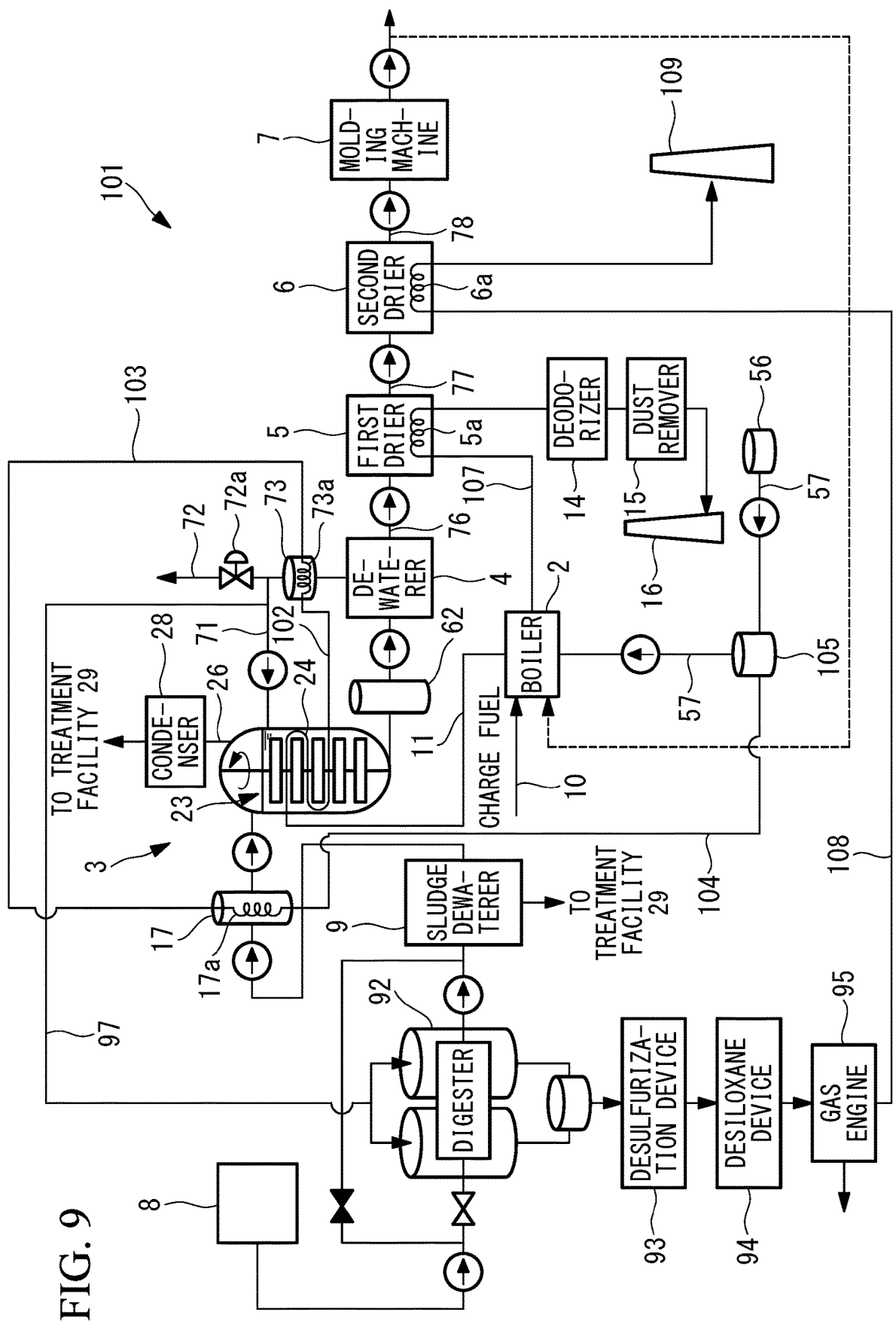
FIG. 9 is a schematic configuration diagram showing a modification of FIG. 8.

As shown in FIG. 9, a biomass fuel manufacturing plant 101 according to this modification is different from the second embodiment mainly in that the vapor and partially drained hot water ejected from the heat transfer tube 24 in the treatment container 21 are not supplied to the first drier 5 but are guided to the separated water tank 73, that the boiler exhaust gas ejected from the boiler 2 is guided to the first drier 5 instead of the second drier 6, and that the internal combustion engine exhaust gas ejected from the gas engine 95 is guided to the second drier 6. Like numbers refer to like constituents in the second embodiment and this modification, and detailed description thereof is omitted.

The vapor and partially drained hot water ejected from the heat transfer tube 24 are guided to a separated-water-tank heat exchanger 73a provided within the separated water tank 73 through a third vapor ejection pipe 102. In the separated-water-tank heat exchanger (fifth heat exchanger unit) 73a, because the vapor and partially drained hot water are heat-exchanged with the separated water separated in the dewaterer 4, the separated water is heated, and the vapor and partially drained hot water are cooled.

The vapor and partially drained hot water heat-exchanged with the separated water in the separated-water-tank heat exchanger 73a are guided to the sludge storage tank 17 through a fourth vapor ejection pipe 103. In more detail, the vapor and partially drained hot water are guided to a sludge-storage-tank heat exchanger 17a provided within the sludge storage tank 17. In the sludge-storage-tank heat exchanger 17a, the vapor and partially drained hot water and the sludge are heat-exchanged. Through this heat exchange, the sludge can be heated with the heat of the vapor and partially drained hot water, and the vapor and partially drained hot water can be cooled.

The vapor and partially drained hot water heat-exchanged with the separated water in the sludge-storage-tank heat exchanger 17a (sixth heat exchanger unit) are guided to a tank 105 through a fifth vapor ejection pipe 104. The vapor and drained hot water guided to the tank 105 are supplied to the boiler 2 through the pipe 57.

The boiler exhaust gas ejected from the boiler 2 is guided to the first heat exchanger 5a provided within the first drier 5 through a boiler exhaust gas pipe 107. The boiler exhaust gas guided to the first heat exchanger 5a is heat-exchanged with the treated matter. Through this heat exchange, the treated matter is heated, and the boiler exhaust gas is cooled. The boiler exhaust gas ejected from the first drier 5 is emitted to the air from the chimney 16 through the deodorizer 14 and the dust remover 15.

The internal combustion engine exhaust gas ejected from the gas engine 95 is guided to the second heat exchanger 6a provided within the second drier 6 through an internal combustion engine pipe 108. The internal combustion engine exhaust gas guided to the second heat exchanger 6a is heat-exchanged with the treated matter. Through this heat exchange, the treated matter is heated, and the internal combustion engine exhaust gas is cooled. The boiler exhaust gas ejected from the first drier 5 is emitted to the air from a chimney 109.

According to this modification, by utilizing the heat of the vapor ejected from the heat transfer tube 24, the separated water to be supplied to the treatment container 21 can be preheated, and the sludge to be supplied to the treatment container 21 can be preheated. Therefore, the energy efficiency of the whole biomass fuel manufacturing plant 81 can be improved compared with the configuration that does not utilize the heat of the vapor.

The vapor and partially drained hot water having undergone the heat exchange with the separated water in the separated-water-tank heat exchanger 73a may be guided to the supply chamber 31 instead of the sludge storage tank 17, and heat exchange may be performed between the vapor and partially drained hot water and the sludge within the supply chamber.

The present invention is not limited to the inventions according to the above-described embodiments, but modifications can be made without departing from the spirit and scope of the present invention.

For example, having described the example in which, according to the above-described embodiment, the separated water separated in the dewaterer 4 is introduced to the treatment container 21 so that the water content of the stored mater within the treatment container 21 is maintained, the present invention is not limited thereto. For example, vapor generated in the boiler 2 may be supplied to the treatment container 21 to maintain the water content of the stored matter. Both of the vapor from the boiler 2 and the separated water separated in the dewaterer 4 may be supplied to maintain the water content of the stored matter.

Although a gas engine is used as the internal combustion engine, an electric generating system including a small boiler and a small vapor turbine may be used.

REFERENCE SIGNS LIST

1 biomass fuel manufacturing plant
2 boiler
3 hydrothermal treatment device
4 dewaterer (dewaterer unit)
5 first drier (fourth heat exchanger unit)
5a first heat exchanger
6 second drier (first heat exchanger unit, third heat exchanger unit)
6a second heat exchanger
7 molding machine
8 sewage treatment facility
9 sludge dewaterer
10 fuel supply pipe
11 vapor supply pipe
12 thermometer
13 boiler exhaust gas pipe
14 deodorizer
15 dust remover
16 chimney
17 sludge storage tank (high-water-content biomass tank)
17a sludge-storage-tank heat exchanger (sixth heat exchanger unit)
18 control unit
35 treatment container
21a ceiling part
21b body part
21c tube support (fixing unit)
22 sludge supply unit (first supply unit)
22a first supply side valve
22b second supply side valve (first switching means)
22c third supply side valve (first switching means)
23 stirrer (stirrer unit)
24 heat transfer tube
25 treated-matter ejecting unit
25a first ejection side valve (second switching means)
25b second ejection side valve (second switching means)
25c third ejection side valve
26 first vapor ejection pipe (vapor ejection unit)
26a flow rate adjustment valve
27 pressure gauge
28 condenser
29 treatment facility (separation treatment unit)
31 supply chamber
31a leak channel
31b leak valve
32 feeder
33 first sludge pipe
34 second sludge pipe
35 third sludge pipe
41 rotation axis
42 stick unit
43 blade unit
44 seal structure
45 elastic buffer
51 horizontal heat transfer tube
52 vertical heat transfer tube
53 second vapor ejection pipe
54 feedwater supply pipe
55 flowmeter
56 feedwater tank
57 pipe
61 ejection chamber
61a leak channel
61b leak valve
62 treated-matter tank 63 first treated-matter pipe
64 second treated-matter pipe
65 third treated-matter pipe
71 separated water pipe (second supply unit, first separated water channel)
71a first branch pipe
71b second branch pipe
71c first flow rate adjustment valve
71d second flow rate adjustment valve
72 blow off pipe
72a flow rate adjustment valve
73 separated water tank
73a separated-water-tank heat exchanger (fifth heat exchanger unit)
76 fourth treated-matter pipe
77 fifth treated-matter pipe
78 sixth treated-matter pipe
81 biomass fuel manufacturing plant
82 vapor ejection pipe
91 biomass fuel manufacturing plant
92 digester
93 desulfurization device
94 desiloxane device
95 gas engine (internal combustion engine)
96 gas engine exhaust gas pipe
97 separated water channel (second separated water channel)
101 biomass fuel manufacturing plant
102 third vapor ejection pipe
103 fourth vapor ejection pipe
104 fifth vapor ejection pipe
105 tank
S space

The invention claimed is:

1. A hydrothermal treatment device performing hydrothermal treatment by heating high-water-content biomass, the hydrothermal treatment device comprising:
a treatment container that stores the high-water-content biomass;
a first supply unit that supplies the high-water-content biomass to inside of the treatment container such that a space is formed in a vertical upper part of the treatment container;
a stirrer unit that is provided within the treatment container and stirs the high-water-content biomass such that flows in a predetermined direction occur; and
at least one heat transfer tube that is disposed within the treatment container so as to cross the predetermined direction and heats the high-water-content biomass with heat of vapor flowing within the heat transfer tube.

2. The hydrothermal treatment device according to claim 1, wherein
the stirrer unit includes a blade unit disposed so as to tilt from a horizontal plane,
the blade unit rotates about an axial direction extending in a vertical up/down direction,
the blade unit has a radial tip disposed so as to be close to an inner periphery surface of the treatment container, and
the heat transfer tube extends in a horizontal direction.

3. The hydrothermal treatment device according to claim 1, wherein
the stirrer unit includes a plurality of blade units that rotate about an axial direction extending in a vertical up/down direction,
the plurality of blade units are disposed at equal intervals along a circumferential direction of the axial direction at positions separated by a predetermined distance in a radial direction from the axial direction about which the blade units rotate, and each of the blade units is disposed so as to tilt at a predetermined angle toward a direction of the rotation from a horizontal plane,
the heat transfer tube extends in a horizontal direction, and
the flows in the predetermined direction are counter flows including flows in the vertical up direction and the vertical down direction.

4. The hydrothermal treatment device according to claim 1, further comprising a second supply unit that supplies water or vapor to the treatment container such that at least a part of stored matter within the treatment container keeps a predetermined water content.

5. The hydrothermal treatment device according to claim 1, wherein
the treatment container includes an outer shell having a body part forming a side surface and a bottom surface and a ceiling part forming a vertical upper surface, and a fixing unit that fixes at least one of the heat transfer tubes to the body part,
the ceiling part is removably fixed to the body part, and
the fixing unit is removably fixed to the body part.

6. The hydrothermal treatment device according to claim 1, further comprising:
a supply chamber that supplies the high-water-content biomass to the treatment container;
an ejection chamber from which stored matter stored within the treatment container is ejected;
a first switching means that switches between a state that the supply chamber and the treatment container are in communication and a state that the supply chamber and the treatment container are isolated; and
a second switching means that switches between a state that the ejection chamber and the treatment container are in communication and a state that the ejection chamber and the treatment container are isolated,
wherein, by keeping a temperature and a pressure within the treatment container at a predetermined temperature and pressure, the high-water-content biomass is supplied from the supply chamber to the treatment container, and the stored matter is ejected from the treatment container to the ejection chamber.

7. The hydrothermal treatment device according to claim 1, further comprising a control unit that adjusts a speed of rotation of the stirrer unit during hydrothermal treatment within the treatment container such that a temperature difference depending on positions of the high-water-content biomass within the treatment container is within a predetermined temperature difference range.

8. A biomass fuel manufacturing plant including the hydrothermal treatment device according to claim 1, the biomass fuel manufacturing plant comprising:
a dewaterer unit that dewaters the high-water-content biomass having undergone hydrothermal treatment in the hydrothermal treatment device;
a first separated water channel that guides separated water separated from the high-water-content biomass in the dewaterer unit to the treatment container;
a vapor ejection unit that ejects vapor occurring within the treatment container to outside of the treatment container; and
a separation treatment unit that separates impurities from the vapor ejected from the vapor ejection unit.

9. The biomass fuel manufacturing plant according to claim 8, further comprising:
a plurality of branch pipes which are branched off from the first separated water channel,
wherein the plurality of branch pipes are in communication with different positions in the vertical up/down direction of the treatment container.

10. The biomass fuel manufacturing plant according to claim 8, further comprising a blow off pipe that externally ejects a predetermined proportion of separated water separated in the dewaterer unit.

11. The biomass fuel manufacturing plant according to claim 8, further comprising:
a boiler that generates vapor with heat of combustion of a charged fuel and supplies the generated vapor to the heat transfer tube; and
a first heat exchanger unit that heat-exchanges between the high-water-content biomass having undergone the hydrothermal treatment in the hydrothermal treatment device and boiler exhaust gas ejected from the boiler.

12. The biomass fuel manufacturing plant according to claim 8, further comprising:
a digester to which the high-water-content biomass before being supplied to the treatment container is introduced;
a second separated water channel that guides the separated water separated from the high-water-content biomass in the dewaterer unit to the digester;
an internal combustion engine that drives by burning fuel gas for the internal combustion engine containing fuel gas ejected from the digester; and
a second heat exchanger unit that heat-exchanges between the high-water-content biomass having undergone the hydrothermal treatment in the hydrothermal treatment device and internal combustion engine exhaust gas ejected from the internal combustion engine.

13. The biomass fuel manufacturing plant according to claim 8, further comprising:
a boiler that generates vapor with heat of combustion of a charged fuel and supplies the generated vapor to the heat transfer tube;
a digester to which the high-water-content biomass before being supplied to the treatment container is introduced;
a second separated water channel that guides the separated water separated from the high-water-content biomass in the dewaterer unit to the digester;
an internal combustion engine that drives by burning fuel gas for the internal combustion engine containing fuel gas ejected from the digester; and
a third heat exchanger unit that heat-exchanges between the high-water-content biomass having undergone the hydrothermal treatment in the hydrothermal treatment device and boiler exhaust gas ejected from the boiler and internal combustion engine exhaust gas ejected from the internal combustion engine.

14. The biomass fuel manufacturing plant according to claim 8, further comprising a fourth heat exchanger unit that heat-exchanges between the high-water-content biomass having undergone the hydrothermal treatment in the hydrothermal treatment device and vapor ejected from the heat transfer tube.

15. The biomass fuel manufacturing plant according to claim 8, further comprising a fifth heat exchanger unit that heat-exchanges between vapor ejected from the heat transfer tube and the separated water ejected from the dewaterer unit.

16. The biomass fuel manufacturing plant according to claim 8, further comprising:
a high-water-content biomass tank that stores the high-water-content biomass to be supplied to the treatment container; and
a sixth heat exchanger unit that heat-exchanges between vapor ejected from the heat transfer tube and the high-water-content biomass within the high-water-content biomass tank.

17. A hydrothermal treatment method performing hydrothermal treatment by heating high-water-content biomass, the hydrothermal treatment method comprising:
a supplying step of supplying the high-water-content biomass to inside of a treatment container such that a space is formed in a vertical upper part of the treatment container;
a stirring step of, by a stirrer unit provided within the treatment container, stirring the high-water-content biomass such that flows in a predetermined direction occur; and
a heating step of heating the high-water-content biomass with vapor flowing within at least one heat transfer tube disposed within the treatment container so as to cross the predetermined direction.

18. A biomass fuel manufacturing method using the hydrothermal treatment method according to claim 17.

* * * * *